(12) United States Patent
Tashiro et al.

(10) Patent No.: US 8,147,635 B2
(45) Date of Patent: Apr. 3, 2012

(54) MANUFACTURING APPARATUS OF FIBER-REINFORCED RESIN STRAND

(75) Inventors: Naoyuki Tashiro, Takasago (JP);
Atsushi Yamamoto, Takaago (JP);
Kazuhisa Fukutani, Kobe (JP);
Yoshiaki Matsubara, Takasago (JP);
Katsumi Ogawa, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 670 days.

(21) Appl. No.: 12/294,741

(22) PCT Filed: Apr. 18, 2007

(86) PCT No.: PCT/JP2007/058426
§ 371 (c)(1),
(2), (4) Date: Sep. 26, 2008

(87) PCT Pub. No.: WO2007/125792
PCT Pub. Date: Nov. 8, 2007

(65) Prior Publication Data
US 2010/0224309 A1    Sep. 9, 2010

(30) Foreign Application Priority Data

Apr. 28, 2006 (JP) ................................. 2006-125962
May 9, 2006 (JP) ................................. 2006-130555
Jun. 12, 2006 (JP) ................................. 2006-161849

(51) Int. Cl.
*B32B 37/00* (2006.01)
(52) U.S. Cl. ........ 156/148; 156/166; 156/180; 156/242; 156/245; 156/433; 156/441; 156/500

(58) Field of Classification Search .................. 156/148, 156/166, 180, 181, 242, 245, 433, 441, 500
See application file for complete search history.

(56) References Cited

U.S. PATENT DOCUMENTS

| | | | | |
|---|---|---|---|---|
| 3,625,735 A | * | 12/1971 | Fernstrom et al. | 427/177 |
| 3,993,726 A | * | 11/1976 | Moyer | 264/171.12 |
| 4,144,371 A | * | 3/1979 | Okie et al. | 156/148 |
| 4,522,022 A | * | 6/1985 | Parker et al. | 57/401 |
| 4,541,884 A | * | 9/1985 | Cogswell et al. | 156/166 |
| 4,607,483 A | * | 8/1986 | Siecke et al. | 57/334 |
| 5,176,775 A | * | 1/1993 | Montsinger | 156/181 |

(Continued)

FOREIGN PATENT DOCUMENTS

JP    5 169445    7/1993

(Continued)

*Primary Examiner* — Jeff Aftergut
(74) *Attorney, Agent, or Firm* — Oblon, Spivak, McClelland, Maier & Neustadt, L.L.P.

(57) ABSTRACT

A manufacturing apparatus of a fiber-reinforced resin strand including spreaders that spread a reinforcing fiber bundle and are provided inside a crosshead to which a molten resin material is supplied continuously from an extruding machine, twisting rollers provided at a downstream position from an exit nozzle of the crosshead and that pultrude a fiber-reinforced resin strand formed of a resin-impregnated fiber bundle from the exit nozzle while imparting twists thereto, and twist retaining rollers provided at a downstream position from the twisting rollers and that retain twists of the fiber-reinforced resin strand. The twisting rollers and the twist retaining rollers are made of metal with asperities being formed on the surface thereof. The manufacturing apparatus can achieve excellent durability and is capable of manufacturing a fiber-reinforced resin strand at a high production rate without causing slipping.

11 Claims, 17 Drawing Sheets

U.S. PATENT DOCUMENTS

| | | | |
|---|---|---|---|
| 5,201,979 A * | 4/1993 | Koba et al. | 156/161 |
| 5,238,633 A * | 8/1993 | Jameson | 264/211.23 |
| 5,529,652 A * | 6/1996 | Asai et al. | 156/180 |
| 5,531,851 A * | 7/1996 | Lin et al. | 156/180 |
| 6,607,798 B1 | 8/2003 | Watanabe et al. | |
| 2001/0027636 A1 | 10/2001 | Naito et al. | |
| 2004/0159966 A1 | 8/2004 | Yamaguchi | |
| 2006/0081177 A1 | 4/2006 | Wakazono et al. | |

FOREIGN PATENT DOCUMENTS

| | | |
|---|---|---|
| JP | 7 251437 | 10/1995 |
| JP | 2000 52368 | 2/2000 |
| JP | 2000 351148 | 12/2000 |
| JP | 2001 40536 | 2/2001 |
| JP | 2001 288639 | 10/2001 |
| JP | 2002 187127 | 7/2002 |
| JP | 2003 175512 | 6/2003 |
| JP | 2004 216702 | 8/2004 |
| JP | 2006 69060 | 3/2006 |
| JP | 2006-110874 | 4/2006 |
| WO | 99 24251 | 5/1999 |

* cited by examiner

MANUFACTURING APPARATUS OF FIBER-REINFORCED RESIN STRAND

TECHNICAL FIELD

The present invention relates to a manufacturing apparatus of a fiber-reinforced resin strand, and more particularly, to a manufacturing apparatus of a fiber-reinforced resin strand achieving excellent productivity of a fiber-reinforced resin strand.

BACKGROUND ART

Pellets made by cutting a long fiber-reinforced resin strand into pieces, for example, of about 3 to 15 mm in length are used in the manufacture of injection molded articles, such as vehicle interior members (the console box, the instrument panel, etc.), vehicle exterior members (the bumper, the fender, etc.), and the housing for electronic device members (a notebook personal computer, a mobile phone, etc.).

As techniques according to a prior art relating to a fiber-reinforced resin strand and a manufacturing apparatus thereof, for example, configurations described below are known. To begin with, a manufacturing apparatus of a fiber-reinforced resin strand according to a first prior art will be described with reference to FIG. 17, which is an explanatory view of this apparatus. The manufacturing apparatus of a fiber-reinforced resin strand according to the first prior art is configured to efficiently manufacture a fiber-reinforced resin strand having high adhesion between a reinforcing fiber and resin. To be more specific, spreaders 58 that spread a reinforcing fiber bundle are provided inside a crosshead 55 into which a molten resin material 52 is continuously supplied from an extruding machine 56. In addition, at the exist side of the crosshead 55, a forming die 59, a cooler 60, twisting rollers (also referred to as cross roller capstans) 61a and 61b, and pultruding rollers 62 are provided sequentially in this order from the exist side.

According to the manufacturing apparatus of a fiber-reinforced resin strand thus configured, after reinforcing fibers 51, 51, ..., and so forth are soaked in a molten resin material 52 inside the crosshead 55 to be impregnated with resin, the sectional shape is determined by the forming die 59, after which they are cooled to harden by the cooler 60. The twisting rollers 61a and 61b are rubber rollers and configured to be driven to rotate in directions opposite to each other. These twisting rollers 61a and 61b are provided so as to incline in directions opposite to each other on a horizontal plane. A fiber-reinforced resin strand 53 rotates about the shaft center as it is pultruded in the direction indicated by an arrow in association with the rotational driving of the respective rollers 61a and 61b while being pinched by the twisting rollers 61a and 61b in the crossed portion (contact portion).

The fiber-reinforced resin strand 53 is twisted on the way to the cooler 60 from the spreader 58a on the lowermost stream side owing to such rotations. The fiber-reinforced resin strand 53 thus twisted is pultruded by the pultruding rollers 62 to a position remote from the crosshead 55 and cut therein by a pelletizer 63 (see, for example, Patent Document 1).

However, the manufacturing apparatus of a fiber-reinforced resin strand according to Patent Document 1 has a problem that it is difficult to manufacture a fiber-reinforced resin strand at a high production rate (for example, 40 m/min).
Patent Document 1: JP-A-5-169445

DISCLOSURE OF THE INVENTION

An object of the invention is to provide a manufacturing apparatus of a fiber-reinforced resin strand capable of manufacturing a fiber-reinforced resin strand at a high production rate.

The invention was devised in view of the foregoing, and provides a manufacturing apparatus of a fiber-reinforced resin strand, characterized by including: spreaders that are provided inside a crosshead into which a molten resin material is continuously supplied from an extruding machine and spread a reinforcing fiber bundle; and twisting rollers that are provided at a downstream position from an exit nozzle of the crosshead and include at least a pair of rollers that pultrudes a fiber-reinforced resin strand formed of a resin-impregnated fiber bundle obtained by letting the reinforcing fiber bundle spread by the spreaders be impregnated with the molten resin material from the exit nozzle while twisting the fiber-reinforced resin strand, wherein, of pairs of rollers included in the twisting rollers, at least the pair of rollers is made of metal on a surface of which asperities are formed.

With the manufacturing apparatus of a fiber-reinforced resin strand according to an aspect of the invention, for at least a pair of rollers that pultrudes a fiber-reinforced resin strand formed of a resin-impregnated fiber bundle from the exit nozzle of the crosshead while twisting the fiber-reinforced resin strand, each roller is made of metal on the surface of which the asperities are formed. Hence, because a frictional coefficient between the both rollers and the fiber-reinforced resin strand increases owing to the asperities on the twisting rollers, it is possible to suppress the occurrence of slipping when the fiber-reinforced resin strand is pultruded. In addition, because the twisting rollers are made of metal, they are more resistant to wear and have a longer life than twisting rollers made of rubber in the first prior art. It is thus possible to keep pultruding the fiber-reinforced resin strand over a long period.

Also, a manufacturing apparatus of a fiber-reinforced resin strand according to another aspect of the invention includes a crosshead in which a long reinforcing fiber bundle continuously introduced therein from upstream is impregnated with molten resin; twisting rollers that are provided downstream from the crosshead and twist a resin-impregnated reinforcing fiber bundle; a cooling device that is provided between the twisting rollers and the crosshead and cools a fiber-reinforced resin strand formed of a reinforcing fiber bundle pultruded from the crosshead; a heating roller device that is provided upstream of the crosshead and pre-heats the reinforcing fiber bundle introduced into the crosshead; and a back tension imparting apparatus that is provided upstream of the heating roller device and imparts back tension to the reinforcing fiber bundle on a way to the heating roller device, wherein the heating roller device has at least two heating rollers each of which generates heat and around which the reinforcing fiber bundle is wound alternately in several turns, and the back tension imparting apparatus imparts the back tension so that the reinforcing fiber bundle comes into contact with each of the heating rollers.

The manufacturing apparatus of a fiber-reinforced resin strand according to another aspect of the invention includes the heating roller device provided upstream of the crosshead and the back tension imparting apparatus that is provided upstream of the heating roller device and imparts back tension to a reinforcing fiber bundle wound around the respective heating rollers in the heating roller device. Accordingly, the reinforcing fiber bundle is wound around at least two heating rollers disposed, for example, at top and bottom in the heating roller device alternately in several turns while back tension is being applied thereto by the back tension imparting apparatus, so that it travels while coming into close contact with the heating rollers being heated and is therefore introduced into the crosshead continuously not at normal temperature but in a pre-heated state.

Hence, even when the pultruding rate of the reinforcing fiber bundle is accelerated, not only is it possible to let the reinforcing fiber bundle be impregnated with molten resin sufficiently owing to the ability to suppress a temperature drop of the molten resin inside the crosshead, but it is also possible to suppress an increase in tension of the reinforcing fiber bundle (resin-impregnated reinforcing fiber bundle) that travels through the crosshead owing to the ability to suppress an increase in viscosity of the molten resin inside the crosshead. Hence, not only can a fiber-reinforced resin strand be manufactured at a pultruding rate higher than the conventional pultruding rate (production rate), for example, a pultruding rate exceeding 40 m/min, but also an installment space for the heating roller device provided to accelerate the pultruding rate can be smaller.

Further, a manufacturing apparatus of a fiber-reinforced resin strand according to another aspect of the invention is an apparatus that manufactures a fiber-reinforced resin strand, characterized by including: a crosshead in which a long reinforcing fiber bundle continuously introduced therein from upstream is impregnated with molten resin; a twisting device that is provided downstream from the crosshead and twists a resin-impregnated reinforcing fiber bundle; a cooling device that is provided between the crosshead and the twisting device and cools a fiber-reinforced resin strand formed of a reinforcing fiber bundle pultruded from the crosshead; and a pultruding device that is provided downstream from the cooling device and pultrudes the fiber-reinforced resin strand from the crosshead, wherein the cooling device has a cooling water bath that stores cooling water to allow the fiber-reinforced resin strand pultruded from the crosshead to pass through the cooling water, and plural water ejection nozzles that are provided inside the cooling water bath to be spaced apart in a traveling direction of the fiber-reinforced resin strand and eject water toward the fiber-reinforced resin strand in the cooling water.

The manufacturing apparatus of a fiber-reinforced resin strand according to another aspect of the invention includes the cooling device provided between the crosshead and the twisting rollers. Plural water ejection nozzles are provided in the cooling water bath storing cooling water for the hot fiber-reinforced resin strand pultruded from the crosshead to pass through while being spaced apart in the traveling direction of the fiber-reinforced resin strand for ejecting water toward the fiber-reinforced resin strand in the cooling water. Hence, by stirring the cooling water inside the cooling water bath with a water flow developed by ejection of water from the water ejection nozzles, a fresh cooling water flow is continuously introduced to come into contact with the fiber-reinforced resin strand that passes through the cooling water. It is thus possible to accelerate the cooling rate for the fiber-reinforced resin strand by efficiently performing heat exchange between the fiber-reinforced resin strand and the cooling water in comparison with a cooling water bath equipped with no water ejection nozzles. Accordingly, in a case where a fiber-reinforced resin strand is manufactured at a high pultruding rate, for example, a pultruding rate exceeding 40 m/min, it is possible to cool the fiber-reinforced resin strand sufficiently without the need to extend the length of the cooling water bath (the length in the fiber-reinforced resin strand traveling direction) in comparison with the case of the conventional pultruding rate of 40 m/min or lower. It is thus possible to manufacture a fiber-reinforced resin strand formed of a reinforcing fiber bundle sufficiently impregnated with the resin material at a higher pultruding rate than the conventional pultruding rate, for example, a pultruding rate exceeding 40 m/min, without causing slipping of the continuous fiber-reinforced resin strand in the twisting device.

A manufacturing method of a fiber-reinforcing resin strand according to another aspect of the invention includes the steps of forming a fiber-reinforced resin strand formed of a resin-impregnated fiber bundle obtained by spreading a reinforcing fiber bundle to be impregnated with a molten resin material inside a crosshead; and twisting the fiber-reinforced resin strand by pultruding the fiber-reinforced resin strand from an exit nozzle of the crosshead, which is characterized in that the fiber-reinforced resin strand is twisted while being pultruded from the exit nozzle of the crosshead using twisting rollers including at least a pair of rollers made of metal and having asperities on surfaces of thereof.

A manufacturing method of a fiber-reinforced resin strand according to another aspect of the invention includes the steps of forming a fiber-reinforced resin strand formed of a resin-impregnated fiber bundle obtained by letting a pre-heated reinforcing fiber bundle be impregnated with molten resin inside a crosshead; and twisting the fiber-reinforced resin strand after being pultruded from the crosshead and cooled, which is characterized in that the reinforcing fiber bundle is pre-heated by forcing the reinforcing fiber bundle, to which back tension is imparted, to come into contact with pre-heated heating rollers.

A manufacturing method of a fiber-reinforced resin strand according to another aspect of the invention includes the steps of forming a fiber-reinforced resin strand formed of a resin-impregnated fiber bundle by letting a reinforcing fiber bundle be impregnated with molten resin inside a crosshead; and twisting the fiber-reinforced resin strand after being pultruded from the crosshead and cooled, which is characterized in that the fiber-reinforced resin strand is cooled by letting the fiber-reinforced resin strand pultruded from the crosshead pass through a cooling water bath storing cooling water and by ejecting water toward the fiber-reinforced resin strand within the cooling water bath.

BEST MODE FOR CARRYING OUT THE INVENTION

Hereinafter, a manufacturing apparatus of a fiber-reinforced resin strand according to embodiments of the invention will be described with reference to the accompanying drawings.

Figure 1:
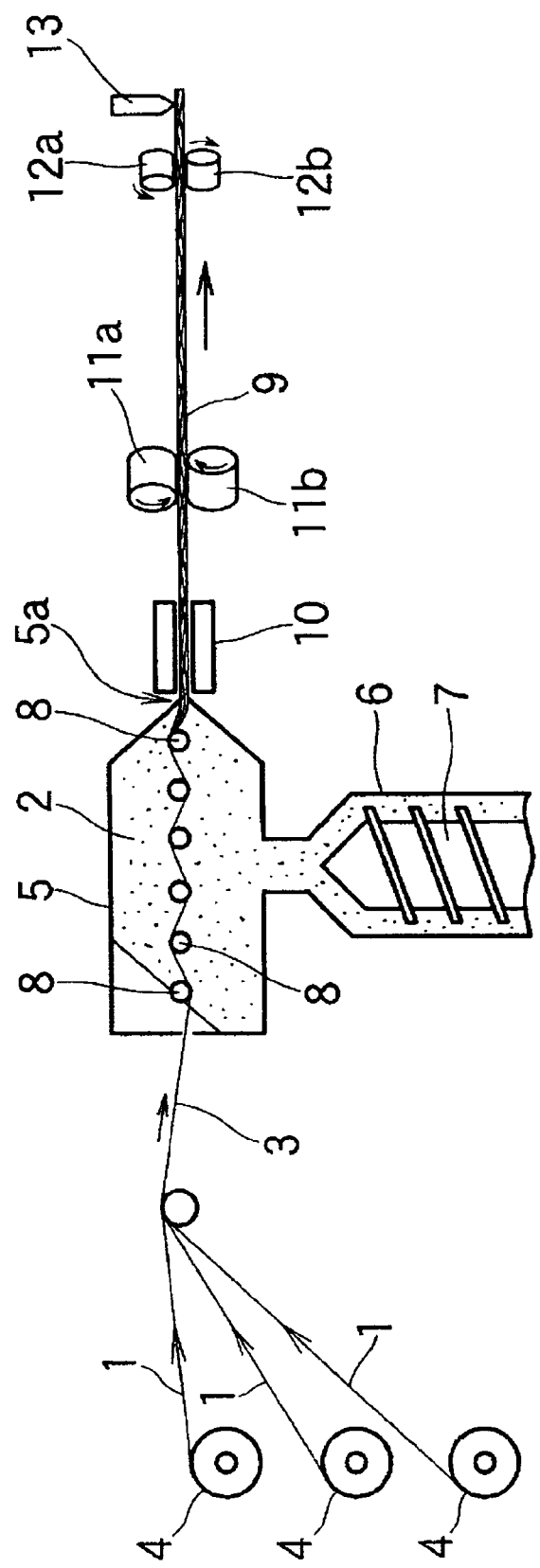
FIG. 1 is an explanatory view schematically showing the configuration of a manufacturing apparatus of a fiber-reinforced resin strand according to a first embodiment of the invention.
Figure 2:
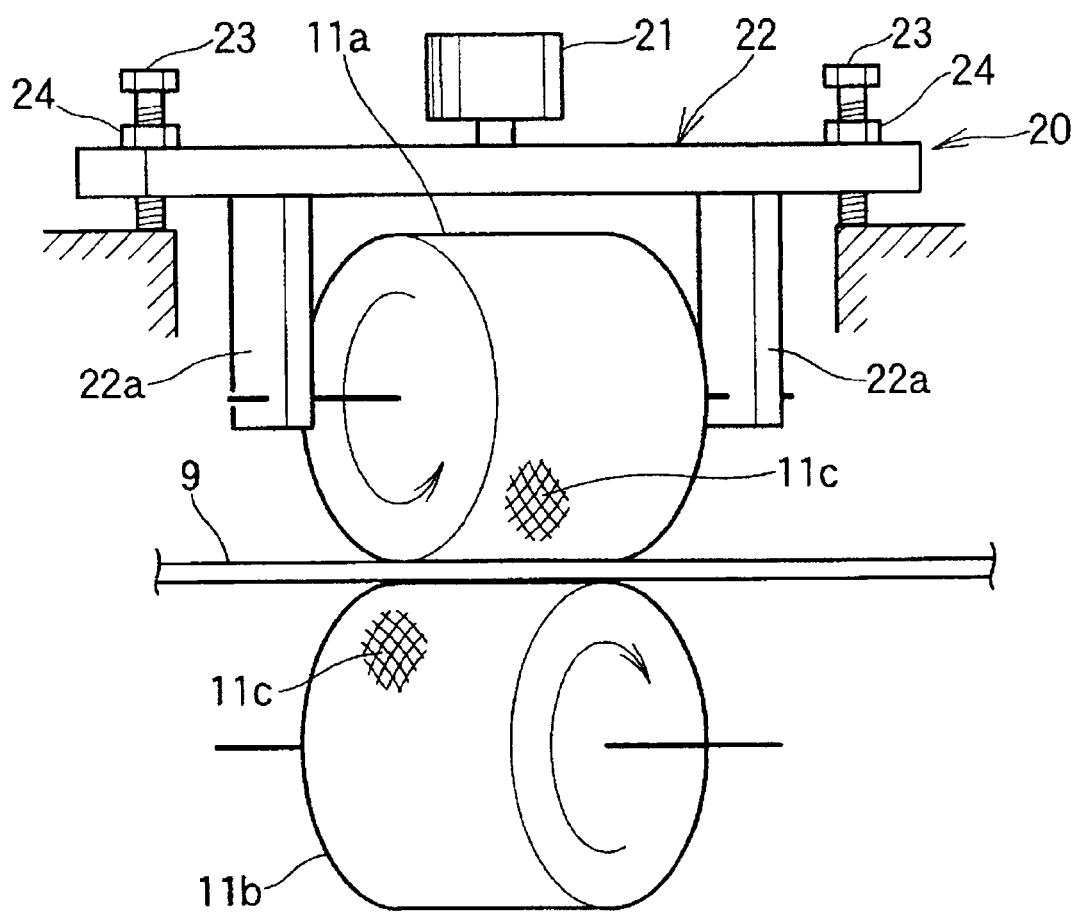
FIG. 2 is a schematic perspective view of twisting rollers in the manufacturing apparatus of a fiber-reinforced resin strand according to the first embodiment of the invention.
Figure 3:
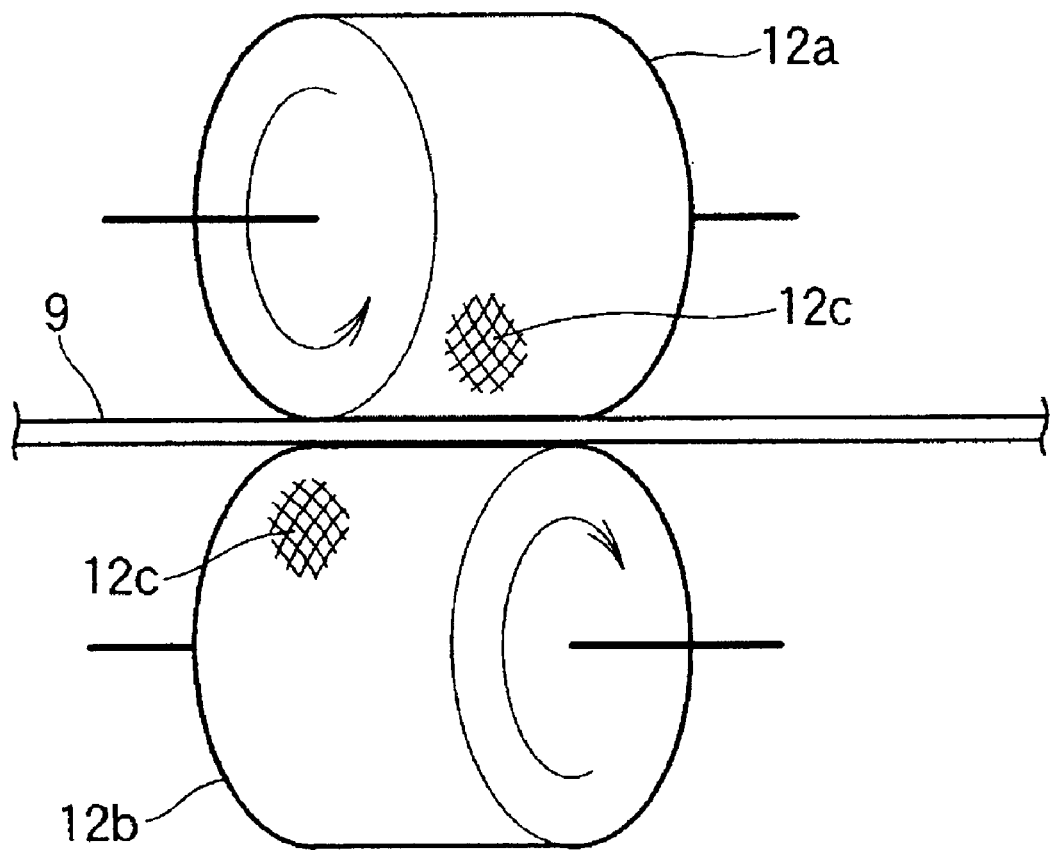
FIG. 3 is a schematic perspective view of twist retaining rollers in the manufacturing apparatus of a fiber-reinforced resin strand according to the first embodiment of the invention.

FIG. 1 is an explanatory view schematically showing the configuration of a manufacturing apparatus of a fiber-reinforced resin strand according to a first embodiment of the invention. FIG. 2 is a schematic perspective view of twisting rollers in the manufacturing apparatus of a fiber-reinforced resin strand according to the first embodiment of the invention. FIG. 3 is a schematic perspective view of twist retaining rollers in the manufacturing apparatus of a fiber-reinforced resin strand according to the first embodiment of the invention.

The manufacturing apparatus of the fiber-reinforced resin strand according to the first embodiment of the invention is configured as is shown in FIG. 1. More specifically, the manufacturing apparatus of a fiber-reinforced resin strand includes plural bobbins 4, a crosshead 5 in which a reinforcing fiber bundle 3 formed of plural reinforcing fibers 1 fed from these bobbins 4 is impregnated with a molten resin material 2, and an extruding machine 6 equipped with a built-in screw 7 for continuously supplying the molten resin material 2 to the crosshead 5. Spreaders 8 formed of rollers are provided inside the crosshead 5, and these spreaders 8 spread the reinforcing fiber bundle 3 and let the reinforcing fiber bundle 3 be impregnated with the molten resin material 2.

Referring to FIG. 1, at a downstream position from an exiting nozzle 5a of the crosshead 5 in the rightward direction are provided twisting rollers 11a and 11b described below that pultrude a fiber-reinforced resin strand 9 formed of a resin-impregnated fiber bundle from the exiting nozzle 5a while imparting twists thereto. In addition, at a downstream position from the twisting rollers 11a and 11b are provided twist retaining rollers 12a and 12b descried below that retain a twisted state of the fiber-reinforced resin strand 9. Further, at a downstream position from the twist retaining rollers 12a and 12b is provided a pelletizer 13 that is a cutting machine for cutting the fiber-reinforced resin strand 9 into pellets. A device provided between the exit nozzle 5a and the twisting rollers 11a and 11b in close proximity to the exit nozzle 5a is a cooler 10 that cools the fiber-reinforced resin strand 9 passing through a hollow portion thereof.

The twisting rollers 11a and 11b are made of metal, and the shaft center of rotation of the upper twisting roller 11a and the shaft center of rotation of the lower twisting roller 11b in FIG. 2 are set not in a direction orthogonal to a moving direction of the fiber-reinforced resin strand 9, but in directions opposite to each other and respectively shifted from the orthogonal direction by specific angles on their respective horizontal planes. Asperities 11c by knurl machining are formed on the surfaces of the twisting rollers 11a and 11b. Incidentally, in this embodiment, the pitch of the asperities 11c is set to 0.3 to 3 mm, and preferably, 0.63 to 1.57 mm, and the depth of the asperities 11c (the height from the bottom of the concave portion to the apex of the convex portion) is set to 0.15 to 1.5 mm.

The twisting rollers 11a and 11b are configured so as to be driven to rotate respectively in directions indicated by arrows in FIG. 2 for pultruding the fiber-reinforced resin strand 9. Further, it is configured in such a manner that an interval between the twisting rollers 11a and 11b can be adjusted to a minimum interval set in response to the diameter of the fiber-reinforced resin strand 9. This adjustment makes is possible to achieve an effect of preventing breakage of the fiber-reinforced resin strand 9.

Incidentally, in the case of the manufacturing apparatus of a fiber-reinforced resin strand according to this embodiment, each of the twisting rollers 11a and 11b is configured to be driven to rotate. However, it may be configured in such a manner that either one of them is driven to rotate while the other rotates freely. When configured in this manner, because the configuration can be simpler, it is possible to achieve an economic effect of being advantageous in terms of the equipment costs. Naturally, a pultruding force for the fiber-reinforced resin strand 9 becomes weaker. However, because a pultruding force to a certain extent can be achieved, this configuration is feasible.

Also, in the case of the manufacturing apparatus of a fiber-reinforced resin strand according to this embodiment, the twisting rollers 11a and 11b are configured in such a manner that each is allowed to operate in a direction to come closer to and move apart from the other roller. However, it may be configured in such a manner that either of them is allowed to come closer to and move apart from the other while the other is made immovable. When configured in this manner, because the configuration of an approximating and spacing operation control mechanism for the twisting rollers 11a and 11b can be simpler, it is possible to achieve an economic effect of being advantageous in terms of the equipment costs.

As with the twisting rollers 11a and 11b, the twist retaining rollers 12a and 12b are made of metal. The shaft center of rotation of the upper twist retaining roller 12a and the shaft center of rotation of the lower twist retaining roller 12b in FIG. 3 are oriented in different directions on the horizontal planes parallel to each other. To be more concrete, the respective shaft centers of rotation are set in directions opposite to each other and shifted by specific angles about a particular reference line orthogonal to the fiber-reinforced resin strand moving direction. Further, asperities 12c are formed on the surfaces of the twist retaining rollers 12a and 12b by knurl machining.

The twist retaining rollers 12a and 12b are configured so as to be driven to rotate respectively in directions indicated by arrows in FIG. 3 for pultruding the fiber-reinforced resin strand 9. Further, it is configured in such a manner that an interval between the twist retaining rollers 12a and 12b can be adjusted to a minimum interval set in response to the diameter of the fiber-reinforced resin strand. It goes without saying that this adjustment of the interval makes is possible to prevent breakage of the fiber-reinforced resin strand 9.

Also, in the case of the manufacturing apparatus of a fiber-reinforced resin strand according to this embodiment, each of the twist retaining rollers 12a and 12b is configured to be driven to rotate. However, it may be configured in such a manner that either one of them is driven to rotate while the other rotates freely. When configured in this manner, because the configuration of the driving device of the twist retaining rollers 12a and 12b can be simpler, it is possible to achieve an economic effect of being advantageous in terms of the equipment costs.

In addition, in the case of the manufacturing apparatus of a fiber-reinforced resin strand according to this embodiment, the twist retaining rollers 12a and 12b are configured in such a manner that each comes closer to and moves apart from the other roller. However, it may be configured in such a manner that either of them operates to come closer to and move apart from the other while the other is made immovable. When configured in this manner, because the configuration of an approximating and spacing operation control mechanism for the twist retaining rollers 12a and 12b can be simpler, it is possible to achieve an economic effect of being advantageous in terms of the equipment costs.

Incidentally, as roller operating means that causes either of the twisting rollers 11a and 11b and either of the twist retaining rollers 12a and 12b to come closer to or move apart from the other, for example, a spring, an air cylinder, a hydraulic cylinder, and so forth can be used. For example, it is possible to adjust a pressing force of each roller to the fiber-reinforced resin strand 9 by adjusting an amount of bending of a spring when the roller operating means is a spring, by adjusting an air pressure when the roller operation means is an air cylinder, and by adjusting a hydraulic pressure when the roller operation means is a hydraulic cylinder.

Also, it is configured in such a manner that the interval between the twisting rollers 11a and 11b and the interval between the twist retaining rollers 12a and 12b can be adjusted, for example, by mechanical means described below. The minimum intervals between these rollers are set in response to the diameter of the fiber-reinforced resin strand 9. The minimum interval is normally set to fall within a range of 70 to 90% of the diameter of the reinforced resin strand 9. However, the length of the minimum interval is determined depending on whether the mechanical strength of the fiber-reinforced resin strand 9 is high or low. To be more concrete, in the case of the fiber-reinforced resin strand 9 made of a high-strength material, the minimum interval is set to fall within the range of 70 to 90% at a point closer to 70%, whereas in the case of the fiber-reinforced resin strand 9 made of a low-strength material, at a point closer to 90%.

Roller minimum interval adjusting means 20 for adjusting an interval between the twisting roller 11a and 11b or between the twist retaining rollers 12a and 12b is of the configuration shown in FIG. 2.

To be more specific, the roller minimum interval adjusting means 20 includes a hydraulic cylinder 21 that imparts a pressing force by the rollers 11a and 11b to the fiber-reinforced resin strand 9, an elevating frame 22 that is moved up and down in association with expansion and contraction of the rod of the hydraulic cylinder 21 and equipped with a pair of roller supporting rackets 22a supporting the both end portions of the shaft of the roller in a rotatable manner, and stopper bolts 23 that are threaded into unillustrated female screws carved in the elevating frame 22 at the both ends and screwed with lock nuts 24. In other words, when an amount of downward protrusion of the stopper bolts 23 from the elevating frame 22 is adjusted in response to an amount of screw-in of the stopper bolts 23, the position at which the lower end portions of the stopper bolts 23 abut on the base supporting the elevating frame 22 varies as well. The position of the elevating frame 22 whose downward movement is limited by the base is thus limited as the minimum interval between the rollers. The elevating frame 22 is moved as the stroke of the hydraulic cylinder 21 is adjusted.

Hereinafter, functions of the manufacturing apparatus of a fiber-reinforced resin strand according to the first embodiment will be described. That is, a reinforcing fiber bundle 3 formed of plural reinforcing fibers 1 introduced into the crosshead 5 from the bobbins 4 are spread by the spreaders 8 and the reinforcing fiber bundle 3 is impregnated with the molten resin material 2 continuously supplied from the extruding machine 6. The resin-impregnated fiber bundle 3 impregnated with the molten resin material 2 is pultruded from the exit nozzle 5a of the crosshead 5 as the fiber-reinforced resin strand 9 while being twisted by the twisting rollers 11a and 11b. To the twisted fiber-reinforced resin strand 9, a pultruding force is imparted by the twist retaining rollers 12a and 12b and twisting forces in the same directions as the twisting rollers 11a and 11b are also imparted. The fiber-reinforced resin strand 9 is then cut into pellets of a specific length by the pelletizer 13.

The manufacturing apparatus of a fiber-reinforced resin strand according to the first embodiment is configured to manufacture pellets from the fiber-reinforced resin strand 9 by the steps as described above. Herein, both the twisting rollers 11a and 11b and the twist retaining rollers 12a and 12b are made of metal, and the asperities are formed on the surfaces thereof by knurl machining.

Hence, with the manufacturing apparatus of a fiber-reinforced resin strand according to the first embodiment, because a frictional coefficient between the fiber-reinforced resin strand 9 and the twisting rollers 11a and 11b as well as the twist retaining rollers 12a and 12b increases owing to the asperities formed on the surfaces thereof by knurl machining, it is possible to suppress the occurrence of slipping when the fiber-reinforced resin strand 9 is pultruded. In addition, because the twisting rollers 11a and 11b are made of metal, they are more resistant to wear and have a longer life than conventional twisting rollers formed of rubber rollers. It is thus possible to keep pultruding the fiber-reinforced resin strand 9 at a high production rate over a longer period than the manufacturing apparatus of a fiber-reinforced resin strand according to the prior art.

EXAMPLE

It is confirmed from Example described below that the surface hardness of the twist rollers 11a and 11b and the twist retaining rollers 12a and 12b is preferably set to Hs 60 or higher. To be more specific, in a case where a fiber-reinforced resin strand is pultruded at a production rate of, for example, 40 m/min, a groove was formed on the roller surfaces in one day with the rubber rollers. The rollers were no longer able to pultrude a fiber-reinforced resin strand and had to be replaced. Given these circumstances, the twisting rollers 11a and 11b and the twist retaining rollers 12a and 12b were made of metal, to be more specific, a heat-treated material of S45C (hardness: Hs 40), and the asperities having a twill line pitch of about 1 mm were formed on the roller surfaces by knurl machining. Herein, the term, "twill line", means knurls provided in a plural form in such a manner that convex portions in the shape of a square pyramid having a rhombic bottom surface are adjacent to one another with each side of the rhombus in between. The phrase, "the twill line pitch of about 1 mm", means that a distance between a pair of ridge lines parallel to each other among the ridge lines of the rhombus is 1 mm. Further, in this Example, a depth from the portion forming the ridge line (concave portion) of the rhombus to the apex of the square pyramid is set to about 0.4 mm.

The machining for the asperities on the roller surfaces is not necessarily limited to knurl machining, and they may be formed by other machining methods, for example, the electric discharge machining, the wire cut machining, and so forth.

With the twisting rollers 11a and 11b and the twist retaining rollers 12a and 12b made of the heat-treated material of S45C (hardness: Hs 40), it was possible to pultrude a fiber-reinforced resin strand over about 140 hours.

However, slipping occurred thereafter, and the fiber-reinforced resin strand was no longer pultruded. Hence, the twisting rollers 11a and 11b and the twist retaining rollers 12a and 12b were made of a heat-treated material of SKD11, and the surface hardness was increased to Hs 60 by subjecting the rollers to vacuum quenching after knurl machining. Then, no slipping occurred after about 7000 hours elapsed, and it was possible to pultrude the fiber-reinforced resin strand. It should be noted that there was no problem in quality, such as the occurrence of flaws on the outer peripheral surface of the fiber-reinforced resin strand caused by the asperities on the twisting rollers 11a and 11b and the twist retaining rollers 12a and 12b.

This indicates that an amount of wear can be extremely small owing to significant enhancement of the wear-resistance of the roller surfaces, and the fiber-reinforced resin strand can be pultruded at a higher production rate, which makes the life longer even when the pressing force applied to the fiber-reinforced resin strand is increased. For comparison, the fiber-reinforced resin strand has been pultruded at a production rate of 70 m/min, and no problem has occurred up to this point in time after 3500 hours elapsed.

Preferable diameters of the twisting rollers 11a and 11b and the twist retaining rollers 12a and 12b were confirmed under the conditions that the asperities having the twill line pitch of 1 mm were formed on the surfaces and the fiber-reinforced resin strand was pultruded at a production rate of 40 m/min using the rollers having the hardness of Hs 60.

Initially, in a case where the diameter of the rollers was 40 mm, slipping occurred readily even at 40 m/min, and it was impossible to pultrude the fiber-reinforced resin strand at a steady production rate. On the contrary, in a case where the diameter of the rollers was 50 mm, no slipping occurred even when the fiber-reinforced resin strand was pultruded at a production rate of 40 m/min, and it was possible to pultrude the fiber-reinforced resin strand at a steady production rate. It was therefore confirmed that the result is far more excellent than 5 m/min in the case of rubber rollers.

Meanwhile, in cases where the diameters of the rollers were 60 mm and 70 mm, no slipping occurred in both cases, and it was possible to pultrude the fiber-reinforced resin strand in a stable state even at a production rate of 40 m/min. In this Example, all the twisting rollers 11a and 11b at top and bottom and twist retaining rollers 12a and 12b at top and bottom were driven.

In Example above has described a case where a material of the twisting rollers 11a and 11b at top and bottom and twist retaining rollers 12a and 12b at top and bottom was SKD11. However, any material capable of securing the hardness of Hs 60 or higher through the hardness enhancement treatment, such as heat treatment, is available, and it is not particularly limited to SKD11. In addition, the surface of the end portion of the roller, where the hardness is substantially the same as that of the roller surface having undergone knurl machining, was measured as the hardness measurement portion. In addition, the manufacturing apparatus of a fiber-reinforced resin strand according to the embodiment described above is a mere example of the invention, and an embodiment of the manufacturing apparatus of a fiber-reinforced resin strand is not limited to the embodiment described above. Further, the design or the like can be changed freely without deviating from the scope of the technical idea of the invention.

Figure 17:
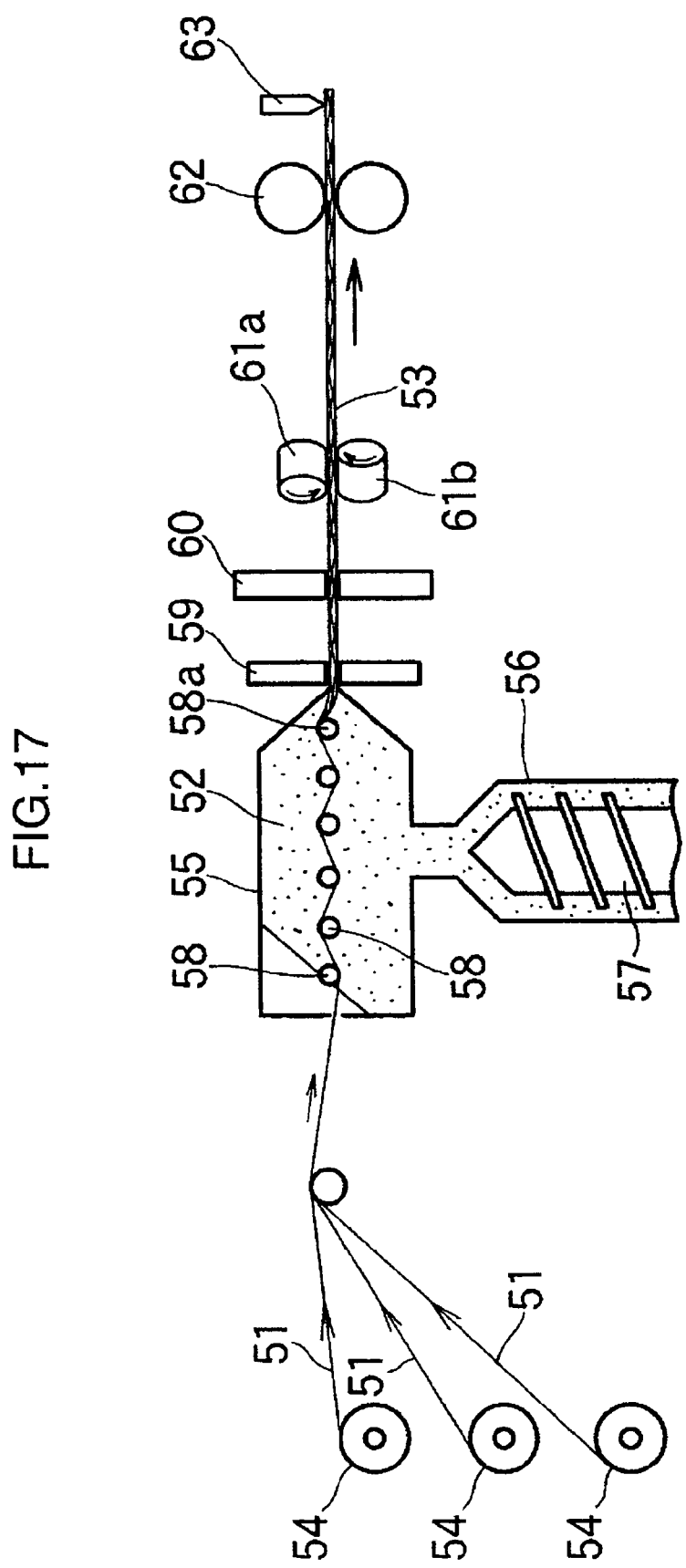
FIG. 17 is an explanatory view of a manufacturing apparatus of a fiber-reinforced resin strand according to a prior art.

As a prior art relating to the manufacturing apparatus of a fiber-reinforced resin strand according to the first embodiment, for example, the configurations described below have been known. To begin with, a manufacturing apparatus of a fiber-reinforced resin strand according to a first prior art will be described with reference to FIG. 17, which is an explanatory view of this apparatus. The manufacturing apparatus of a fiber-reinforced resin strand according to the first prior art is configured to efficiently manufacture a fiber-reinforced resin strand having high adhesion between a reinforcing fiber and resin. To be more specific, spreaders 58 that spread a reinforcing fiber bundle are provided inside a crosshead 55 into which a molten resin material 52 is continuously supplied from an extruding machine 56. In addition, at the exit side of the crosshead 55, a forming die 59, a cooler 60, twisting rollers (also referred to as cross roller capstans) 61a and 61b, and pultruding rollers 62 are provided sequentially in this order from the exit side.

According to the manufacturing apparatus of a fiber-reinforced resin strand thus configured, after reinforcing fibers 51, 51, . . . , and so forth are soaked in the molten resin material 52 inside the crosshead 55 to be impregnated with resin, the sectional shape is determined by the forming die 59, after which they are cooled to harden by the cooler 60. The twisting rollers 61a and 61b are rubber rollers and configured to be driven to rotate inversely. These twisting rollers 61a and 61b are provided so as to incline in directions opposite to each other on a horizontal plane. A fiber-reinforced resin strand 53 rotates about the shaft center while being pultruded in the direction indicated by an arrow as the fiber-reinforced resin strand 53 is pinched by the twisting rollers 61a and 61b at the crossed portion.

Twists are imparted to the fiber-reinforced resin strand 53 on the way to the cooler 60 from the spreader 58a on the lowermost stream side owing to such rotations. The fiber-reinforced resin strand 53 to which twists are imparted is cut by a pelletizer 63 provided at a position farther from the crosshead 55 than the pultruding rollers 62 (see, for example, JP-A-5-169445).

A manufacturing apparatus of a continuous fiber-reinforced thermoplastic resin strand (hereinafter, referred to as the fiber-reinforced resin strand) according to a second prior art will be described briefly. In short, the manufacturing apparatus of a fiber-reinforced resin strand according to the second prior art is configured to be able to perform the manufacturing continuously over a long period when manufacturing the fiber-reinforced resin strand. More specifically, it is an apparatus configured in such a manner that a reinforcing fiber bundle is introduced into molten thermoplastic resin inside a thermoplastic resin bath container (crosshead) to let the reinforcing fiber bundle be impregnated with the thermoplastic resin and a continuous fiber-reinforced thermoplastic resin strand is manufactured by pultruding a resin-impregnated fiber bundle from the exit nozzle of the thermoplastic resin bath container. A roller that comes into contact with a reinforcing fiber bundle is disposed inside the thermoplastic resin bath container so as to cross a traveling start-up of the reinforcing fiber bundle. The roller is formed of the shaft and a tube, and the tube is supported around the shaft in a rotatable manner. In addition, means for retaining the twists of the fiber-reinforced resin strand imparted from the twisting rollers is provided between the twisting rollers that twist the fiber-reinforced resin strand and the pelletizer (see, for example, JP-A-2003-175512).

The twisting rollers in the manufacturing apparatus of a fiber-reinforced resin strand according to the first prior art are thought to be excellent because they are of a simple configuration and is yet able to pull the fiber-reinforced resin strand while twisting the strand. However, because they are configured in such a manner that two cylindrical twisting rollers are inclined in different directions so as to pull the strand at a point (not a line, but a point) at which these twisting rollers come into contact with each other, there is a problem that the fiber-reinforced resin strand readily slips. In order to prevent such slipping, in the case of the first prior art, rollers made of rubber are adopted as the twisting rollers as described above.

Hence, with the manufacturing apparatus of a fiber-reinforced resin strand according to the first prior art, because the twisting rollers wear out soon and they are not able to impart a high pressing force to the fiber-reinforced resin strand, the fiber-reinforced resin strand cannot be produced continuously at a high production rate.

When the fiber-reinforced resin strand is produced at a production rate of, for example, 40 m/min by imparting a high pressing force so as to eliminate the slipping occurring at a high production rate, wearing is promoted and slipping occurs frequently. The rollers therefore have to be replaced in about 20 hours, which poses a problem that the twisting rollers become unusable soon.

In the manufacturing apparatus of a fiber-reinforced resin strand according to the second prior art, the means for retaining the twists of the fiber-reinforced resin strand imparted from the twisting rollers is provided between the twisting rollers and the pelletizer. However, it is a set of rollers disposed oppositely with the fiber-reinforced resin strand in between and configured so as to displace the angles of the roller shafts with respect to each other. Hence, as with the twisting rollers according to the first prior art, because they are configured in such a manner that the fiber-reinforced resin strand comes into point contact with them, there is also a problem that the fiber-reinforced resin strand readily slips.

Hence, an object of the first embodiment is to provide a manufacturing apparatus of a fiber-reinforced resin strand achieving excellent durability and capable of manufacturing a fiber-reinforced resin strand at a high production rate without causing slipping.

Hence, a fiber-reinforced resin strand according to the first embodiment is a manufacturing apparatus of a fiber-reinforced resin strand, characterized by including: spreaders that are provided inside a crosshead into which a molten resin material is continuously supplied from an extruding machine and spread a reinforcing fiber bundle; and twisting rollers that are provided at a downstream position from an exit nozzle of the crosshead and include at least a pair of rollers that pultrudes a fiber-reinforced resin strand formed of a resin-impregnated fiber bundle obtained by letting the reinforcing fiber bundle spread by the spreader be impregnated with the molten resin material from the exit nozzle while twisting the fiber-reinforced resin strand, wherein, of pairs of rollers included in the twisting rollers, at least the pair of rollers is made of metal on a surface of which asperities are formed.

With the manufacturing apparatus of a fiber-reinforced resin strand according to the first embodiment, for at least a pair of rollers that pultrudes a fiber-reinforced resin strand formed of a resin-impregnated fiber bundle from the exit nozzle of the crosshead and twists the fiber-reinforced resin strand, each roller is made of metal on the surface of which the asperities are formed. Hence, because a frictional coefficient between the both rollers and the fiber-reinforced resin strand increases owing to the asperities on the twisting rollers, it is possible to suppress the occurrence of slipping when the fiber-reinforced resin strand is pultruded. In addition, because the twisting rollers are made of metal, they are more resistant to wear and have a longer life than twisting rollers formed of rubber rollers in the first prior art. It is thus possible to keep pultruding the fiber-reinforced resin strand over a long period.

In the manufacturing apparatus of a fiber-reinforced resin strand according to the first embodiment, it is preferable to further include: twist retaining rollers provided at a downstream position from the twisting rollers and formed of a pair of rollers that retains a twisted state of the fiber-reinforced resin strand, wherein both the rollers of the twist retaining rollers are made of metal on a surface of which asperities are formed.

According to this configuration, both the rollers of the twist retaining rollers formed of a pair of rollers for retaining a twisted state of the fiber-reinforced resin strand are made of metal on the surface of which the asperities are formed. Hence, because a frictional coefficient between the both rollers and the fiber-reinforced resin strand increases owing to the asperities on the twist retaining rollers, it is possible to suppress the occurrence of slipping when a twisted state of the fiber-reinforced resin strand is retained. In addition, because the twist retaining rollers are made of metal, they are resistant to wear and have a long life. It is thus possible to keep pultruding the fiber-reinforced resin strand over a long period.

In the fiber-reinforced resin strand according to the first embodiment, it is preferable that a surface hardness of the metal is set to Hs 60 or higher.

According to this configuration, the surface hardness of the metal forming the twisting rollers and the twist retaining rollers is set to Hs 60 or higher. Hence, because the outer circumferences of the twisting rollers and the twist retaining rollers has a high hardness, excellent wear resistance, and a long life, the operation rate of the manufacturing apparatus of a fiber-reinforced resin strand can be enhanced, which can in turn enhance the productivity of a fiber-reinforced resin strand.

In manufacturing apparatus of a fiber-reinforced resin strand according to the first embodiment, it is preferable that a major diameter of each of the rollers is set to 50 mm or greater.

As has been described, the fiber-reinforced resin strand and the twisting rollers and the fiber-reinforced resin strand and the twist retaining rollers have theoretically point contact. However, because the fiber-reinforced resin strand undergoes deformation slightly, they have surface contact in practice. According to the configuration described above, because the major diameter of all the twisting rollers and twist retaining rollers is set to 50 mm or greater, a contact area of the two rollers, and further a contact area of the two rollers and the fiber-reinforced resin strand are enlarged in response to the major diameter of these twisting rollers and twist retaining rollers. It is thus possible to enhance the ability to prevent slipping significantly.

In the manufacturing apparatus of a fiber-reinforced resin strand according to the first embodiment, it is preferable that at least one roller in a particular pair of rollers included in the twisting rollers and at least one of the both rollers of the twist retaining rollers are configured in such a manner so as to be able to come closer to and move apart from the other roller and to press the fiber-reinforced resin strand at a constant or variable pressing force.

According to this configuration, at least one roller in a particular pair of rollers included in the twisting rollers and at least one roller of both the rollers of the twist retaining rollers are configured so as to be able to come closer to and move apart from the other roller and to press the fiber-reinforced resin strand at a constant or variable pressing force. Hence, because pressing forces of the twisting rollers and the twist retaining rollers with respect to the fiber-reinforced resin strand can be increased, it is possible to prevent slipping. In addition, it is possible to adjust the pressing forces of the twisting rollers and the twist retaining rollers with respect to the fiber-reinforced resin strand to appropriate pressing forces in response to a hardness of the fiber-reinforced resin strand and a production rate of the fiber-reinforced resin strand.

In the manufacturing apparatus of a fiber-reinforced resin strand according to the first embodiment, it is preferable to further include roller interval adjusting means for enabling an adjustment of an interval between rollers making a pair among the twisting rollers or an interval between the both rollers of the twist retaining rollers so that a minimum interval set in response to a diameter of the fiber-reinforced resin strand is achieved.

With the manufacturing apparatus of a fiber-reinforced resin strand according to the first embodiment, it is configured in such a manner that the interval between the rollers forming a pair included in the twisting rollers or the interval between the both rollers of the twist retaining rollers reaches the minimum interval set in response to the diameter of the fiber-reinforced resin strand. Hence, because the fiber-reinforced resin strand can be pressed to reach an appropriate crushing margin depending on the diameter of the fiber-reinforced resin strand, there can be achieved an effect of being able to prevent breakage of the fiber-reinforced resin strand.

Figure 4:
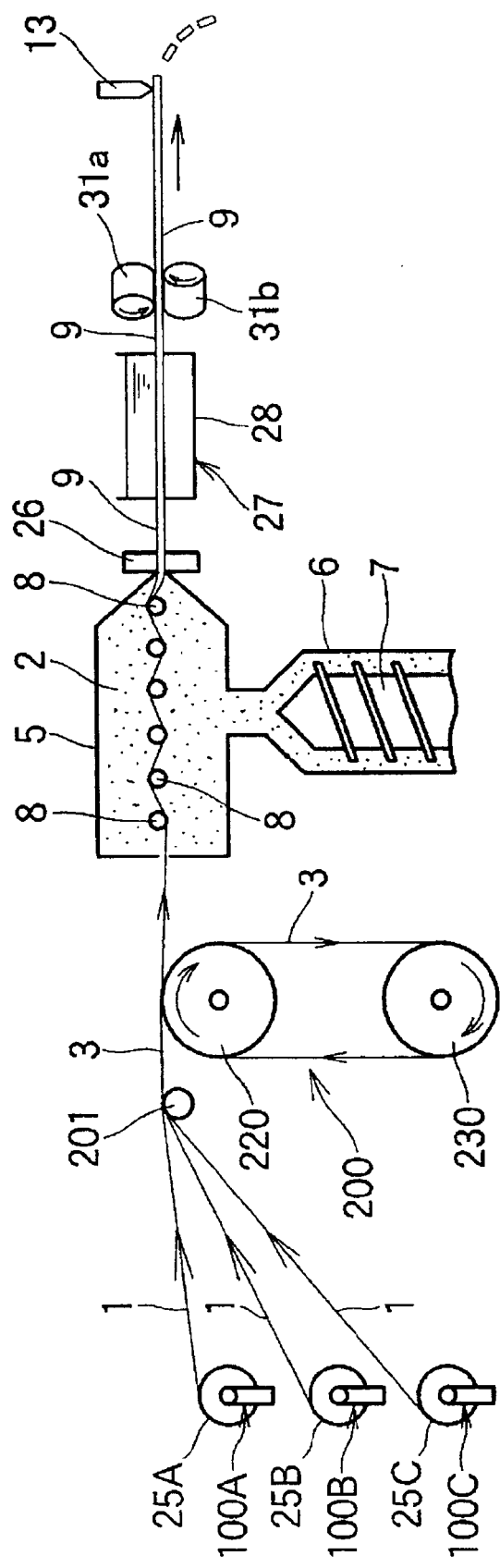
FIG. 4 is a configuration explanatory view showing the overall configuration of a manufacturing apparatus of a fiber-reinforced resin strand according to a second embodiment of the invention.

Hereinafter, a second embodiment of the invention will be described with the drawings. FIG. 4 is a configuration explanatory view showing the overall configuration of a manufacturing apparatus of a fiber-reinforced resin strand according to the second embodiment of the invention.

As is shown in FIG. 4, reinforcing fibers (rovings) 1 are fed from plural bobbins, three bobbins 25A through 25C herein, and combined into a reinforcing fiber bundle 3 by an inlet-side guide 201 of a heating roller device 200. In order to pre-heat the reinforcing fiber bundle 3, the reinforcing fiber bundle 3 is introduced into a heating roller device 200 equipped with a pair of heating rollers 220 and 230 disposed at top and bottom. Reinforcing fiber back tension imparting devices 100A through 100C are provided to the bobbins 25A through 25C, respectively. The reinforcing fiber bundle 3 is thus wound around a pair of the heating rollers 220 and 230 alternately in several turns while back tension is being applied thereto, so that it is heated through contact as it comes into close contact with the heating rollers 220 and 230.

An extruding machine 6 having a built-in screw 7 and a crosshead (molten resin bath container) 5 into which molten resin (melted thermoplastic resin) 2 is continuously supplied from the extruding machine 6 and the reinforcing fiber bundle 3 pre-heated by the heating roller device 200 is introduced from the heating roller device 200 are provided immediately downstream from the heating roller device 200. Plural spreaders (opening and impregnation rollers) 8 for letting the continuously supplied reinforcing fiber bundle 3 be impregnated with the molten resin 2 are provided inside the crosshead 5. A forming die 26 that performs forming (molding) of a hot fiber-reinforced resin strand 9 formed of a resin-impregnated reinforcing fiber bundle to which twists are imparted by being pultruded from the crosshead 5 is attached at the exit of the crosshead 5.

A cooling device 27 that cools the hot fiber-reinforced resin strand 9 from the crosshead 5 in cooling water is provided downstream from the crosshead 5 to which the forming die 26 is attached. Also, twisting rollers 31a and 31b are provided immediately downstream from the cooling device 27. The fiber-reinforced resin strand 9 manufactured by the manufacturing apparatus of this embodiment and introduced to the downstream side of the twisting rollers 31a and 31b is cut into pellets by a pelletizer (strand cutter) 13 provided downstream from the twisting rollers 31a and 31b.

Figure 5:
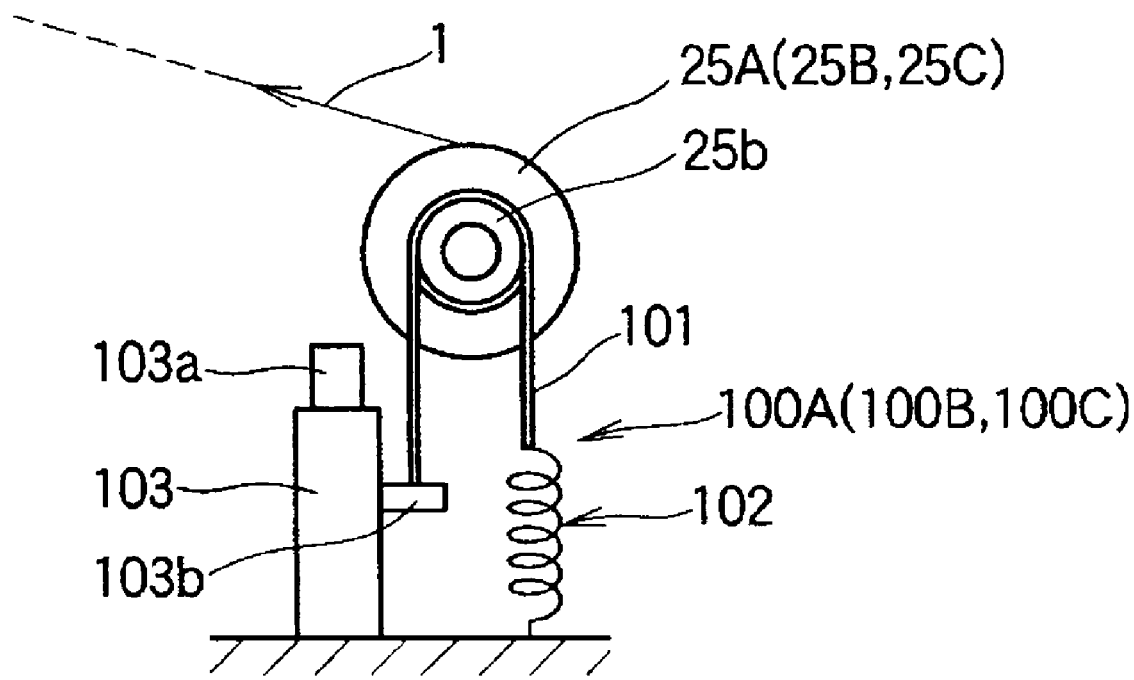
FIG. 5 is a view schematically showing the configuration of a reinforcing fiber back tension imparting apparatus of FIG. 4.

FIG. 5 is a view schematically showing the configuration of the reinforcing fiber back tension imparting apparatus of FIG. 4.

As is shown in FIG. 5, a rotary drum body 25b is fixed at one end portion of the rotational shaft of the bobbin 25A formed by winding up the reinforcing fiber 1. One end of a strip-shaped shoe member 101 wound halfway around the outer peripheral surface of the rotary drum body 25b is coupled to a hook at one end of a tension coil spring 102 to which a hook at the other end is fixed. Numeral 103 denotes a back tension adjusting slider that moves an elevating nut portion 103b vertically by rotating the screw shaft (not shown) using a motor 103a. The other end of the strip-shape shoe member 101 is coupled to the elevating nut portion 103b of the back tension adjusting slider 103.

As the strip-shaped shoe member 101 is pressed against the rotary drum body 25b by a restoring force of the tension coil spring 102, back tension is imparted to the reinforcing fiber 1 pulled out from the bobbins 25A through pultrusion by the twisting rollers 31a and 31b. By increasing and decreasing a pressing force by the strip-shaped shoe member 101 by moving the elevating nut portion 103b vertically, it is possible to adjust the back tension applied to the reinforcing fiber 1.

The strip-shaped shoe member 101, the tension coil spring 102, and the back tension adjusting slider 103 together form a reinforcing fiber back tension imparting device 100A that applies back tension to the reinforcing fiber 1 from the bobbin 25A. A reinforcing fiber back tension imparting device 100B that applies back tension to the reinforcing fiber 1 from the bobbin 25B and a reinforcing fiber back tension imparting device 100C that applies back tension to the reinforcing fiber 1 from the bobbin 25C are of the same configuration as the reinforcing fiber back tension imparting device 100A. The reinforcing fiber back tension imparting devices 100A through 100C together form a back tension imparting apparatus that applies back tension to a reinforcing fiber bundle 3 wound around the heating rollers 220 and 230.

Figure 6:
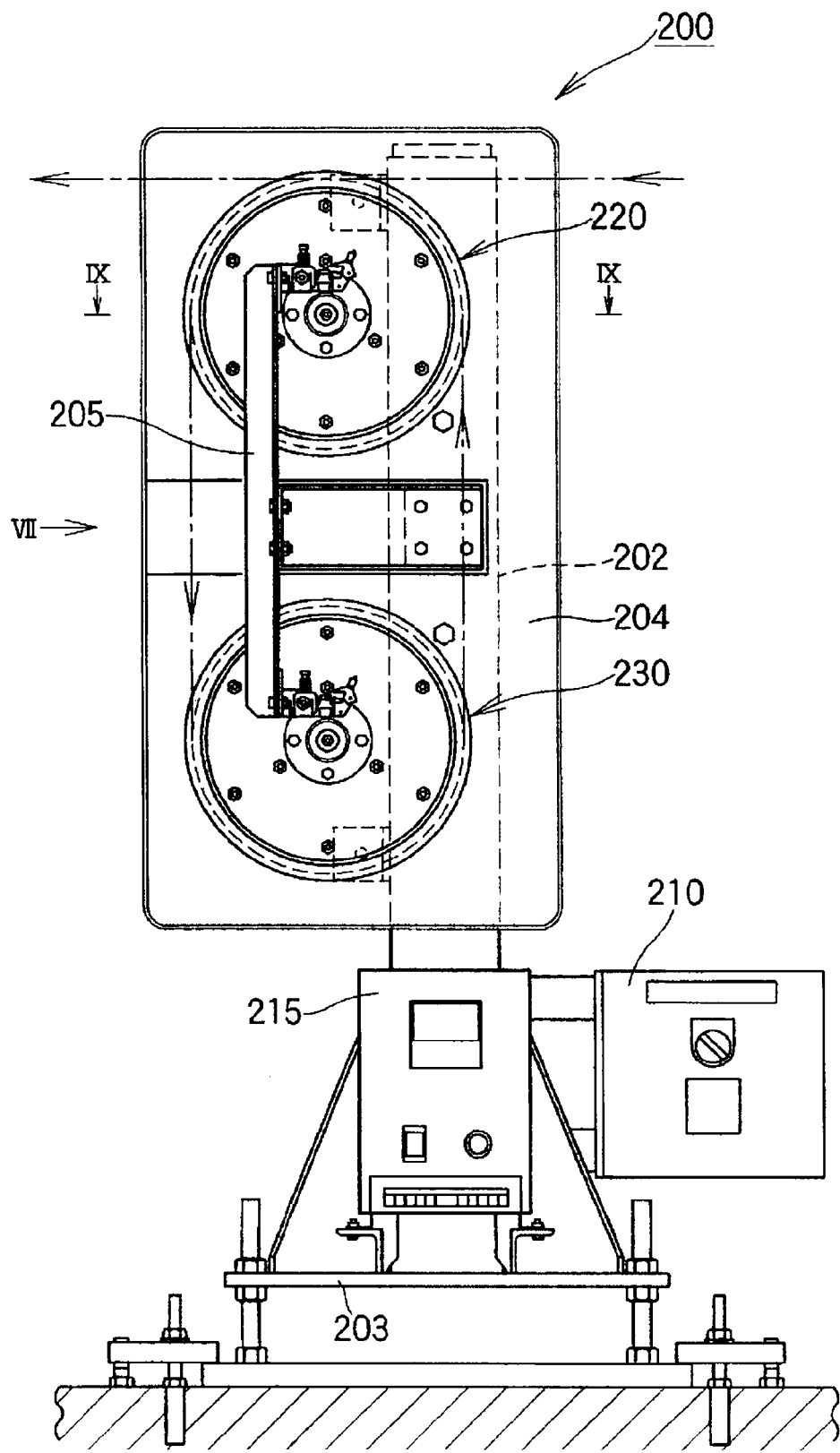
FIG. 6 is a front view showing the configuration of a heating roller device of FIG. 4.
Figure 7:
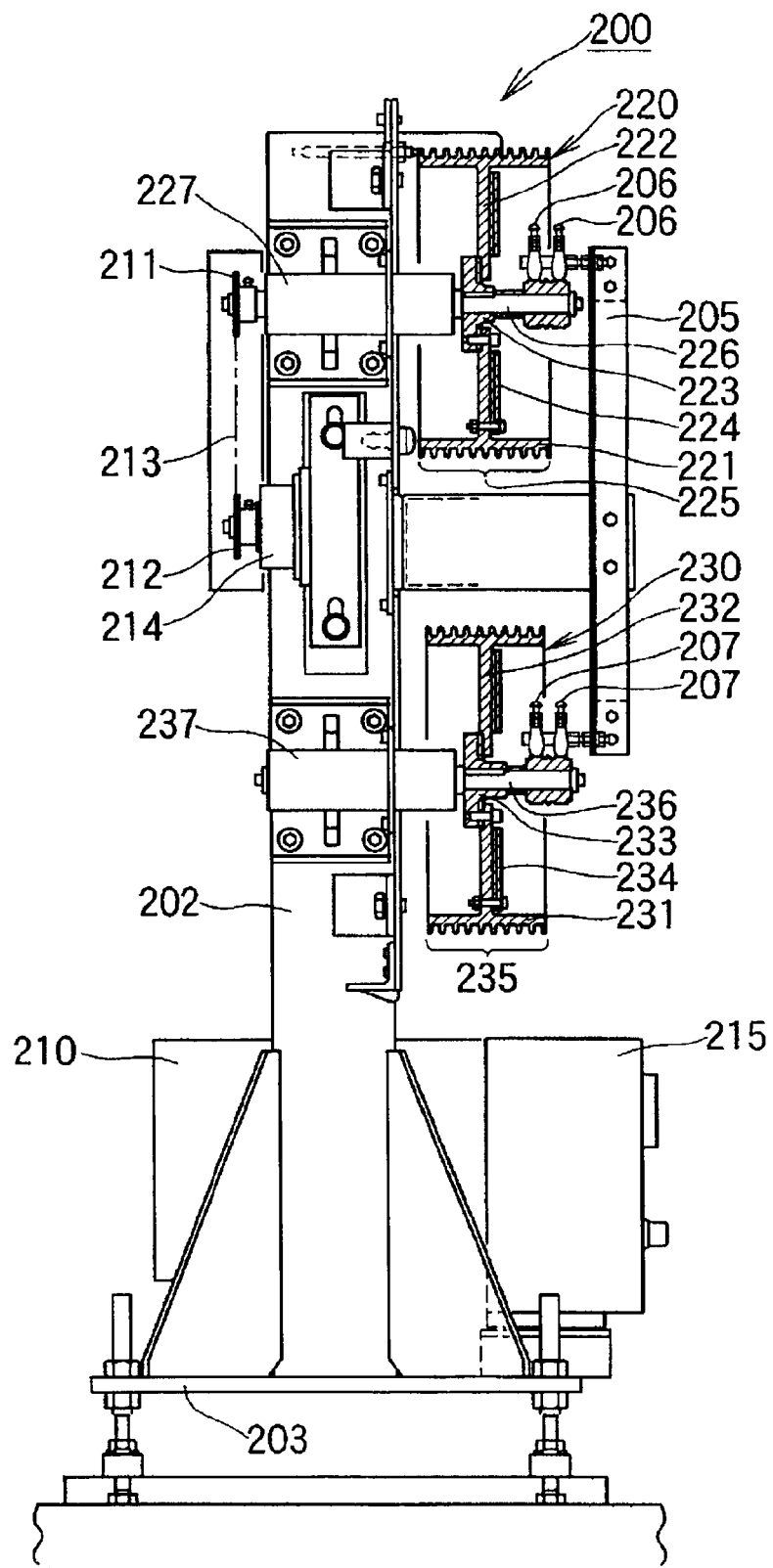
FIG. 7 is a side view used to describe the configuration of the heating roller device shown in FIG. 6 when viewed in a direction indicated by an arrow VII.
Figure 8:
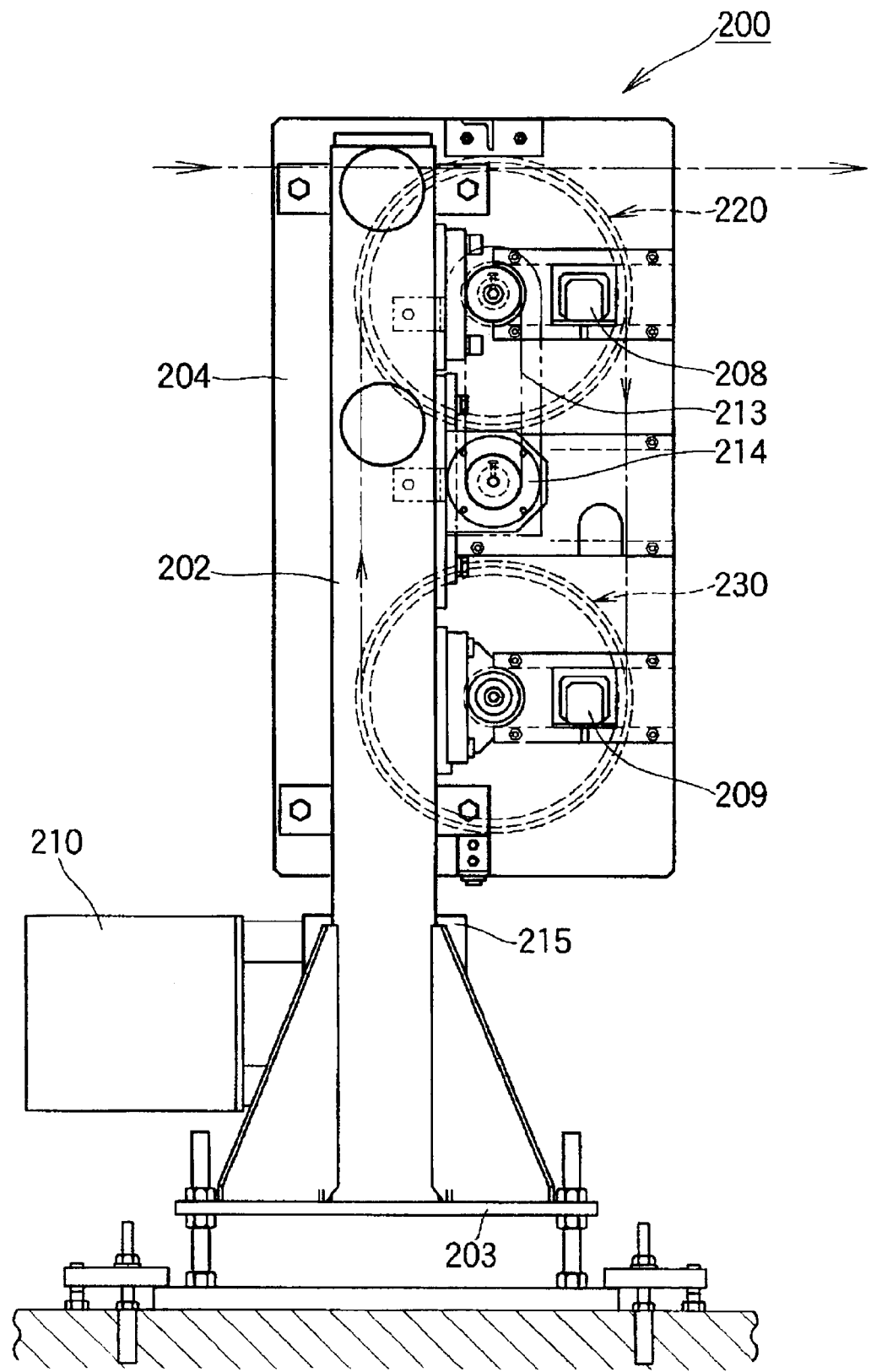
FIG. 8 is a rear view of the heating roller device shown in FIG. 6.
Figure 9:
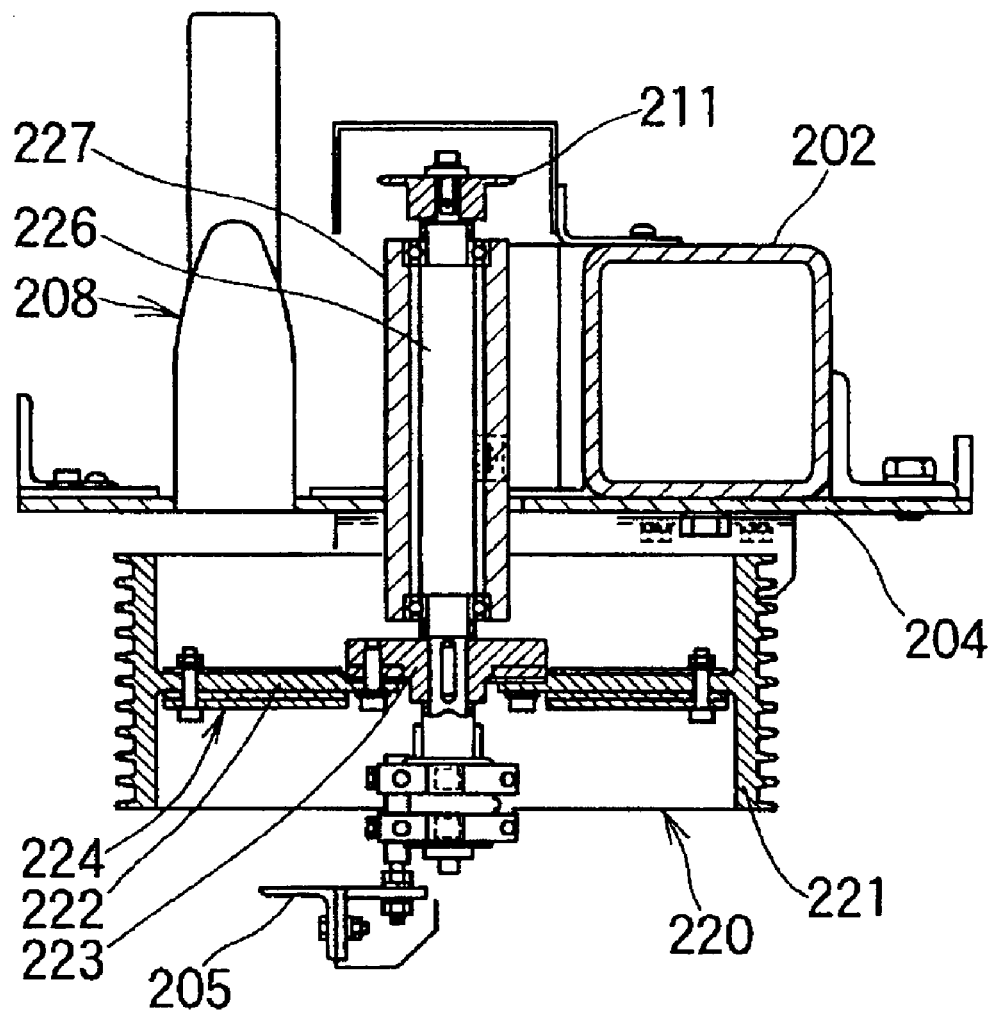
FIG. 9 is a cross section taken on line IX-IX of FIG. 6.

FIG. 6 is a front view showing the configuration of the heating roller device of FIG. 4. FIG. 7 is a partial sectional side view of the heating roller device shown in FIG. 6 when viewed in a direction indicated by an arrow VII. FIG. 8 is a rear view of the heating roller device shown in FIG. 6. FIG. 9 is a cross section taken on line IX-IX of FIG. 6.

Referring to FIG. 6 through FIG. 9, numeral 202 denotes a supporting frame in the shape of a hallow square prism. The supporting frame 202 is fixed in a standing posture to the top surface of an upper base plate 203 of the base body fixed to the floor surface. A pair of the heating rollers 220 and 230 that are spaced apart vertically at a specific interval is attached to the supporting frame 202 in a rotatable manner.

The heating rollers 220 and 230 will be described first. The upper heating roller 220 is formed of a heating roller main body and a heating roller supporting body. The heating roller main body includes an annular portion made of aluminum alloy that has an outer circumferential portion 221 formed in an annular shape having a specific width and a rib portion 222 in the shape of a ring plate provided inside the outer circumferential portion 221 as one piece, a boss portion 223 coupled to the rib portion 222 of the annular portion by being screwed with a bolt, and a heater (ring heater) 224 in the shape of a ring plate formed of a heater line attached to one surface of the rib portion 222. Plural circumferential grooves aligned side by side in the roller rotational shaft direction, ten circumferential grooves 225 herein, are formed in the outer circumferential portion 221 as grooves that guide the reinforcing fiber bundle 3, so that a heating roller with grooves is formed. The heating roller supporting body includes a heating roller rotational shaft 226 coupled to the boss portion 223 of the heating roller main body using a key, and a bearing case 227 of a cylindrical shape that rotatably supports and accommodates the heating roller shaft 226 rotating integrally with the heating roller main body at bearings attached at the both end portions. The bearing case 227 of the upper heating roller 220 is fixed to the supporting frame 202 via an attachment member.

The lower heating roller 230 is of the same configuration as the upper heating roller 220, and is formed of a heating roller main body and a heating roller supporting body. The heating roller main body includes an annular portion made of aluminum alloy that has an outer circumferential portion 231 and a rib portion 232 in the shape of a ring plate as one piece, a boss portion 233 coupled to the rib portion 232 of the annular portion by being screwed with a bolt, and a heater 234 in the shape of a ring plate formed of a heater line attached to one surface of the rib portion 232. Plural circumferential grooves aligned side by side in the roller 29 rotational shaft direction, nine circumferential grooves 235 herein, are formed in the outer circumferential portion 231 as grooves that guide the reinforcing fiber bundle 3, so that a heating roller with grooves is formed. The heating roller supporting body includes a heating roller rotational shaft 236 coupled to the boss portion 233 of the heating roller main body using a key, and a bearing case 237 of a cylindrical shape that rotatably supports and accommodates the heating roller shaft 236 rotating integrally with the heating roller main body at bearings attached at the both end portions. The bearing case 237 of the lower heating roller 230 is fixed to the supporting frame 202 via an attachment member. Although it is not shown in the drawing, a heating roller cover that surrounds the heating rollers 220 and 230 with a lead-in portion and a lead-out portion of the reinforcing fiber bundle 3 being open is provided.

The reinforcing fiber bundle 3 introduced while back tension is being applied thereto is wound around the heating rollers 220 and 230 alternately by going around by a quarter of the circumferential groove 225 at the left end in the upper heating roller 220 of FIG. 7, moving down to go half around the circumferential groove 235 at the left end of the lower heating roller 230 of FIG. 7, moving up to go half round the circumferential groove 225 second from the left end of the upper heating roller 220 of FIG. 7, and moving down to go half around the circumferential groove 235 second from the left end of the lower heating roller 230 of FIG. 7, and so forth, and it is introduced into the crosshead 5 after it goes around by a quarter of the circumferential groove 225 at the right end of the upper heating roller 220 of FIG. 7. In FIG. 6, the inlet-side guide 201 (see FIG. 4) that guides all the reinforcing fibers 1 from the respective bobbins 25A through 25C collectively to the upper heating roller 220 as the reinforcing fiber bundle 3 is omitted from the drawing.

Power supply to heaters 224 and 234 and the heater temperature adjustment will now be described. Power from an unillustrated first heating power supply is supplied to the heater 224 of the upper rotating heating roller 220 via slip rings 206 and 206 to which a line from the first heating power supply is connected. The slip rings 206 and 206 are supported on a slip ring bracket 205 fixed to the supporting frame 202 via an attachment member. Likewise, power from an unillustrated second heating power supply is supplied to the heater 234 of the rotating heating roller 230 via slip rings 207 and 207. The slip rings 207 and 207 are supported on the slip ring bracket 205.

Numeral 204 denotes an attachment plate located behind the heating rollers 220 and 230 and fixed to the supporting frame 202. Numeral 208 denotes a non-contact radiation thermometer attached to the attachment plate 204 oppositely to the rib portion 222 of the upper heating roller 220 to measure the temperature of the heating roller 220. Likewise, numeral 209 denotes a non-contact radiation thermometer attached to the attachment plate 204 oppositely to the rib portion 232 of the heating roller 230 to measure the temperature of the lower heating roller 230 (see FIG. 8 and FIG. 9).

A temperature adjuster (control panel) 210 controls power to be supplied to the heater 224 from the first heating power supply for the temperature of the upper heating roller 220 to stay at the target set value according to the temperature measurement value information provided from the radiation thermometer 208, and controls power to be supplied to the heater 234 from the second heating power supply for the temperature of the lower heating roller 230 to stay at the target set value according to the temperature measurement value information provided from the radiation thermometer 209.

A powder brake that performs tension adjustment of the reinforcing fiber bundle 3 pulled out from the heating roller device will now be described. As are shown in FIG. 7 and FIG. 8, a chain 213 is stretched over a sprocket 211 coupled to the heating roller rotational shaft 226 of the upper heating roller 220 and a sprocket 212 coupled to the rotational shaft of an electromagnetic powder brake 214 fixed to the supporting frame 202. By decreasing a braking force by the powder brake 214, it is possible to adjust the tension of the reinforcing fiber bundle 3 introduced into the crosshead 5 to an adequate value. Numeral 215 denotes a powder brake control panel.

Figure 10:
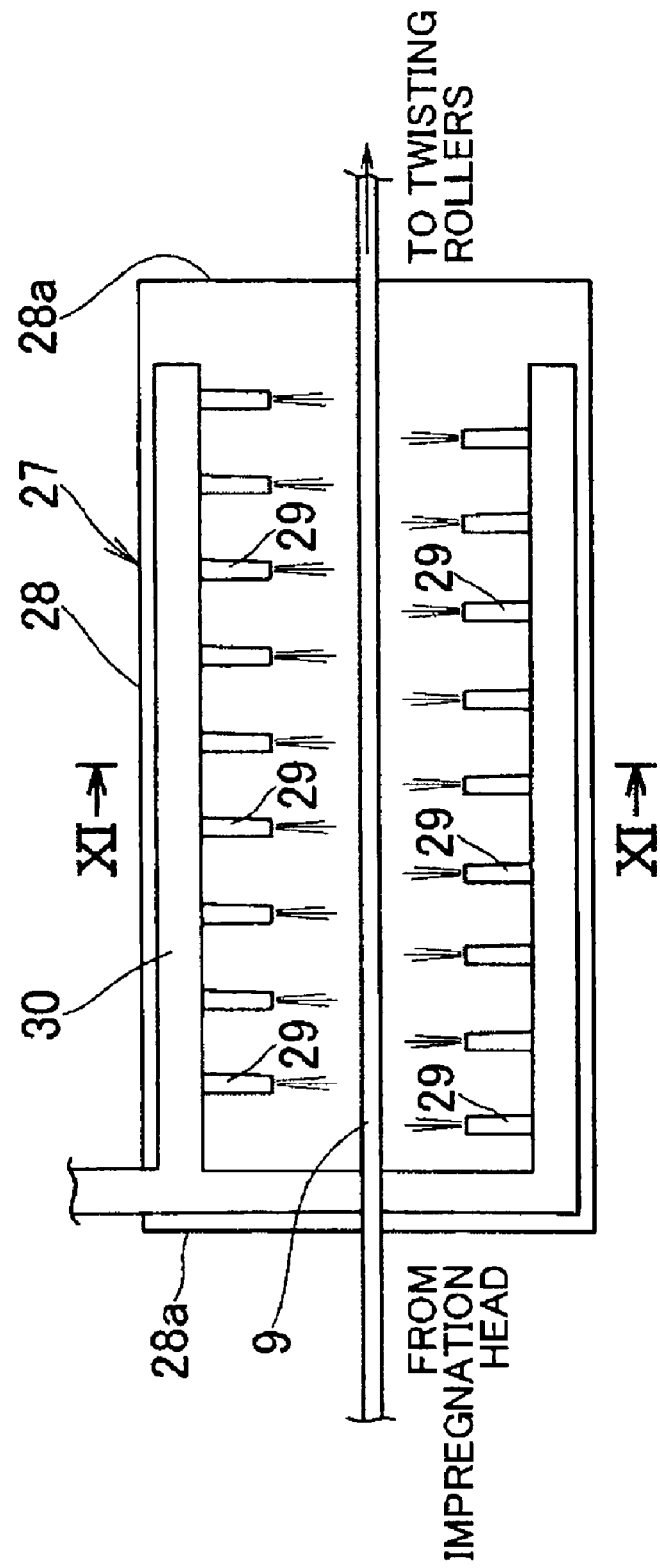
FIG. 10 is a plan view schematically showing the configuration of a cooling device of FIG. 4.
Figure 11:
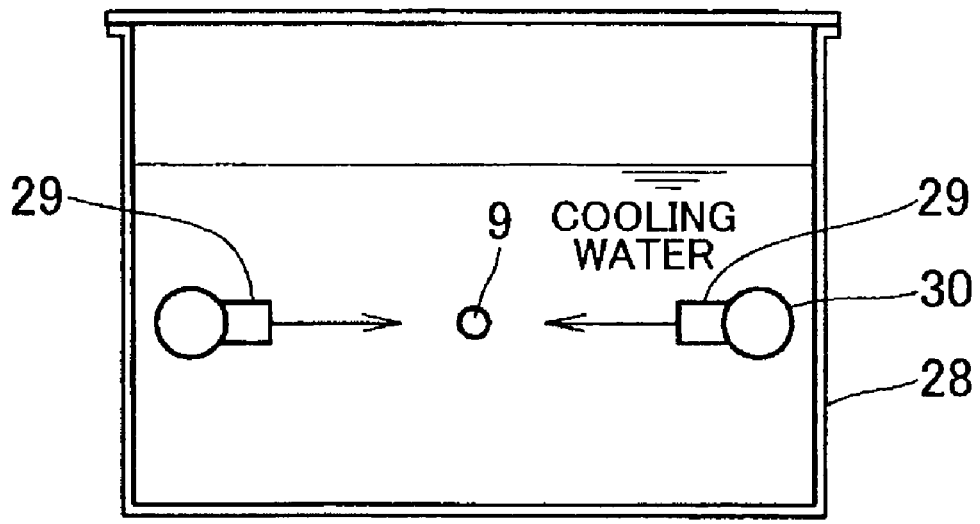
FIG. 11 is a cross section taken on line XI-XI of FIG. 10.

The cooling device 27 will now be described. FIG. 10 is a plan view schematically showing the configuration of the cooling device of FIG. 4. FIG. 11 is a cross section taken on line XI-XI of FIG. 10.

The cooling device 27 includes a cooling water bath 28 having a box shape with an openable lid at the top to store cooling water to let the fiber-reinforced resin strand 9, which is pultruded from the crosshead 5 to travel in the horizontal direction, pass through the cooling water, plural water ejection nozzles 29 disposed at regular intervals from upstream to downstream along the traveling direction of the fiber-reinforced resin strand 9 within the cooling water bath 28 in a stagger fashion to have a traveling path of the fiber-reinforced resin strand 9 in between for ejecting water toward the fiber-reinforced resin strand 9 within the cooling water, and a pressurized water supply tube 30 that supplies pressurized water to these water ejection nozzles 29.

U-shaped notch openings (not shown) are provided to cooling water bath end plates 28a and 28a of the cooling water bath 28 to allow the resin-impregnated reinforcing fiber bundle to pass through. The cooling water inside the cooling water bath 28 flows down through the U-shaped notch openings in the cooling water bath end plates 28a and 28a. However, because cooling water is supplied to the cooling water bath 28 from the pressurized water supply tube 30 via the water ejection nozzles 29, the water is maintained at the constant level. Alternatively, the water may be maintained at the constant level by supplying cooling water from a supply port provided apart from the water ejection nozzles to supply cooling water to the cooling water bath. Unillustrated pump, drain container, and drain tube to return cooling water from the cooling water bath 28 for circulation are provided below the cooling water bath end plates 28a and 28a.

As has been described, as the cooling device 27 between the crosshead 5 and the twisting rollers 31a and 31b, plural water ejection nozzles 29 spaced apart along the traveling direction of the fiber-reinforced resin strand 9 for ejecting water toward the fiber-reinforced resin strand 9 in the cooling water are provided inside the cooling water bath 28 inside of which the hot fiber-reinforced resin strand 9 pultruded from the crosshead 5 travels in the horizontal direction in the cooling water.

Hence, by stirring the cooling water inside the cooling water bath with a water flow developed by ejection of water from the water ejection nozzles 29, a fresh cooling water flow is continuously introduced to come into contact with the fiber-reinforced resin strand 9 that travels in the cooling water from the inlet side to the outlet side. It is thus possible accelerate the cooling rate for the fiber-reinforced resin strand 9 by efficiently performing heat exchange between the fiber-reinforced resin strand 9 and the cooling water in comparison with a cooling water bath equipped with no water ejection nozzles 29.

Figure 12:
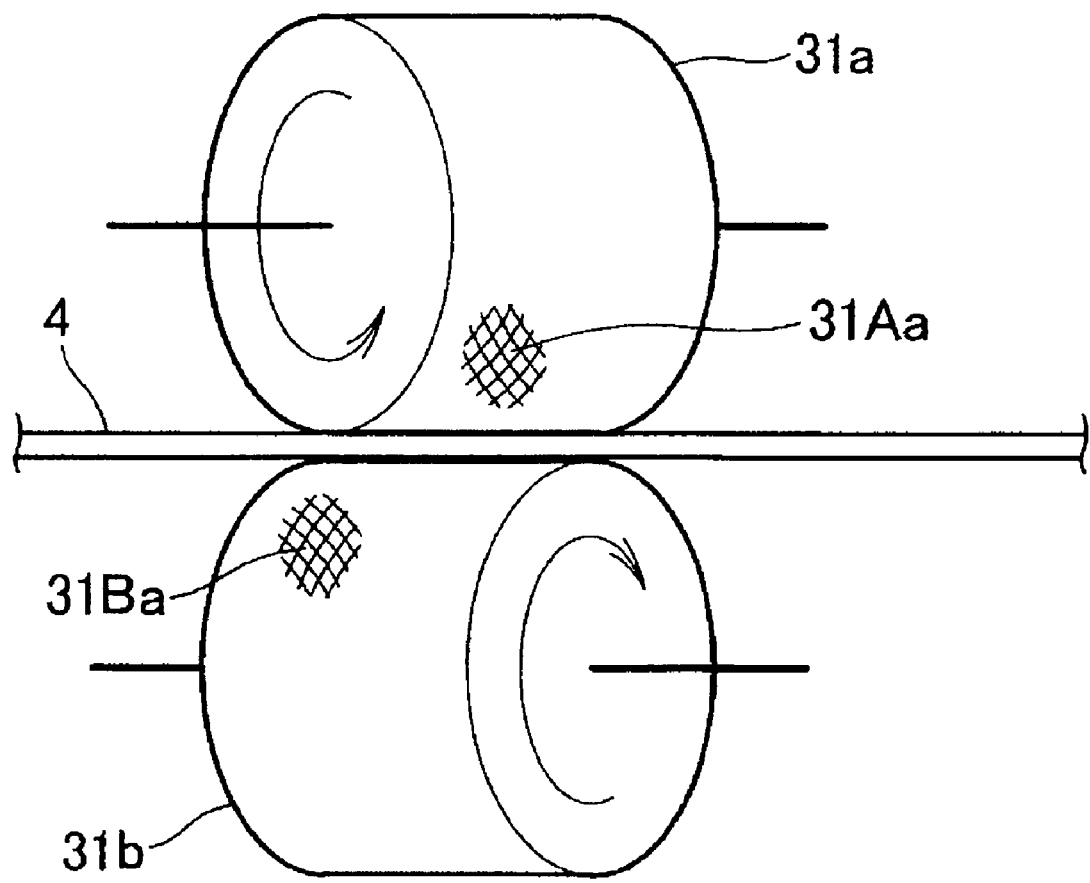
FIG. 12 is an explanatory view of twisting rollers of FIG. 4.

The twisting rollers 31a and 31b will now be described. FIG. 12 is an explanatory view of the twisting rollers of FIG. 4.

The paired twisting rollers 31a and 31b are disposed oppositely with the fiber-reinforced resin strand 9 from the cooling device 27 in between while their respective rotational shaft lines are maintained on parallel planes (horizontal planes) and their respective rotational shaft lines are crossed with each other. More specifically, the rotational shaft line of the upper twisting roller 31a and the rotational shaft line of the lower twisting roller 31b in FIG. 12 are set not in a direction orthogonal to the pultruding direction (traveling direction) of the fiber-reinforced resin strand 9 but displaced equiangularly by a specific angle in directions opposite to each other with respect to the pultruding direction when viewed in a plane. For the upper twisting roller 31a made of metal, asperities 31Aa are formed on the entire roller surface (roller outer circumferential surface) by knurl machining. Likewise, for the lower twisting roller 31b made of metal, asperities 31Ba are formed on the entire roller surface (roller outer circumferential surface) by knurl machining.

In this embodiment, both the paired twisting rollers 31a and 31b are configured to be driven to rotate. Because a pair of the twisting rollers 31a and 31b has a capability of imparting twists to the resin-impregnated reinforcing fiber bundle as well as a capability of pultruding the fiber-reinforced resin strand 9 from the cooling device 27, there is no need to provide a separate pultruding device downstream from the twisting rollers 31a and 31b. In a case where the twisting rollers 31a and 31b and the strand cutter are installed with a long distance or a case where a fragile strand is pultruded at a high speed, a pair of pultruding rollers (for example, rollers 12a and 12b of FIG. 1) having the same configuration as the twisting rollers 31a and 31b may be provided downstream from the twisting rollers 31a and 31b as a pultruding device.

As has been described, the paired twisting rollers 31a and 31b are made of metal and the asperities 31Aa and 31Ba are formed on the roller surfaces thereof. Hence, because a frictional coefficient between the twisting rollers 31a and 31b made of metal and the fiber-reinforced resin strand 9 becomes larger, combined with the cooling effect on the fiber-reinforced resin strand 9 by the cooling device 27, it is possible to impart twists to the fiber-reinforced resin strand 9 while eliminating the occurrence of slipping of the fiber-reinforced resin strand 9 in a reliable manner. In addition, because the twisting rollers are made of metal, they are more resistant to wear and have a longer life than twisting rollers made of rubber. It is thus possible to pultrude the continuous fiber-reinforced resin strand 9 over a long period without causing slipping.

The manufacturing of a fiber-reinforced resin strand by the manufacturing apparatus of a continuous fiber-reinforced resin strand configured as described above will now be described. The reinforcing fiber bundle 3 formed of reinforcing fibers 1 fed from the bobbins 25A through 25C is introduced into a pair of the heating rollers 220 and 230 disposed at top and bottom in the heating roller device 200 while back tension is being applied thereto by the reinforcing fiber back tension imparting devices 100A through 100C, and is then introduced into the crosshead 5 in a state where the temperature thereof is raised through contact heating by being wound around the heating rollers 220 and 230 alternately in several turns (herein, nine turns). The reinforcing fiber bundle 3 is impregnated with resin while passing by the respective spreaders 8 inside the crosshead 5 filled with hot molten resin 2 supplied from the extruding machine 6, and is thereby made into a resin-impregnated reinforcing fiber bundle. With this resin-impregnated reinforcing fiber bundle, twists are developed and grown from the spreader 8 on the downstream side inside the crosshead 5 as the starting point owing to the twisting operations by the twisting rollers 31a and 31b. As has been described, by letting the reinforcing fiber bundle 3 be impregnated with molten resin 2 supplied from the extruding machine 6 in the crosshead 5 and by imparting twists to the resin-impregnated reinforcing fiber bundle by the twisting operations by the twisting rollers 31a and 31b, the continuous fiber-reinforced resin strand 9 formed of the resin-impregnated reinforcing fiber bundle to which twists are imparted from the crosshead 5 is pultruded continuously.

The hot fiber-reinforced resin strand 9 pultruded continuously from the crosshead 5 by way of the forming die 26 is introduced into the cooling device 27 to travel in the cooling water inside the cooling water bath 28, and is cooled to harden by undergoing a water flow from the water ejection nozzles 29 disposed in a stagger fashion with the traveling path in between, after which it is introduced into the twisting rollers 31a and 31b. The twisting rollers 31a and 31b perform the twisting operations and the pultrusion on the cooled fiber-reinforced resin strand 9 from the cooling device 27. The fiber-reinforced resin strand 9 introduced to the downstream side of the twisting rollers 31a and 31b is cut into pellets by the pelletizer 13 provided downstream from the twisting rollers 31a and 31b.

As has been described, the manufacturing apparatus of a continuous fiber-reinforced resin strand of this embodiment includes the heating roller device 200 a pair of the heating rollers 220 and 230 on the upstream side of the crosshead 5, and further includes the back tension imparting apparatus formed of the reinforcing fiber back tension imparting devices 100A through 100C that imparts back tension to the reinforcing fiber bundle 3 wound around the heating rollers 220 and 230 on the upstream side of the heating roller device 200. Accordingly, the reinforcing fiber bundle 3 is wound around a pair of the heating rollers 220 and 230 disposed at top and bottom alternately in several turns while back tension is being applied thereto from the back tension imparting apparatus, so that it travels while coming into close contact with the heating rollers 220 and 230 heated by the heaters 224 and 234, respectively, and is therefore introduced into the crosshead 5 continuously not at normal temperature but in a pre-heated state.

Hence, even when the pultruding rate of the reinforcing fiber bundle 3 is accelerated, not only is it possible to let the reinforcing fiber bundle 3 be impregnated with molten resin sufficiently owing to the ability to suppress a temperature drop of the molten resin inside the crosshead 5, but it is also possible to suppress an increase in tension of the reinforcing fiber bundle (resin-impregnated reinforcing fiber bundle) that travels through the crosshead 5 owing to the ability to suppress an increase in viscosity of the molten resin inside the crosshead 5. As a consequence, not only can a fiber-reinforced resin strand be manufactured at a pultruding rate (production rate) higher than the conventional pultruding rate, for example, a pultruding rate exceeding 40 m/min, but also the installment space of the heating roller device 200 provided to accelerate the pultruding rate can be smaller.

A manufacturing experiment of a fiber-reinforced resin strand was conducted using the manufacturing apparatus shown in FIG. 4.

The heating roller main bodies of the heating rollers 220 and 230 had a diameter of about 250 mm and a width of the outer circumferential portion 221 of about 100 mm. A distance between the roller rotational shafts of a pair of the heating rollers 220 and 230 was about 400 mm.

The length of the cooling water bath 28 of the cooling device 27 was 2 m. Regarding the water ejection nozzles 29, 20 of them were disposed in a line on one side (the lower side of FIG. 10) and 20 of them were disposed in a line on the other side (the upper side of FIG. 10) with respect to the strand traveling path in a stagger fashion with the fiber-reinforced resin strand traveling path in between. A distance between the center lines of the adjacent water ejection nozzles 29 in the strand traveling direction was 70 mm. Both the twisting rollers 31a and 31b were mechanisms that are driven to rotate and made of a quenched heat-treated material of SKD11 (alloy tool steel) with asperities having a twill line pitch of 1 mm being formed on the entire roller surfaces by knurl machining.

An experiment to manufacture a fiber-reinforced resin strand having a strand outer diameter of 2.4 mm was conducted using a glass fiber as a reinforcing fiber and polypropylene as thermoplastic resin. Consequently, in the case of the configuration in which the reinforcing fiber bundle 3 preheated by the heating rollers 220 and 230 was introduced into the crosshead 5, it was possible to perform pultrusion at the maximum pultruding rate of 90 m/rain (the pultruding rate was not accelerated any further), which is so high that it cannot be compared with a conventional rate. In this case, the temperature of the reinforcing fiber bundle 3 introduced into the crosshead 5 was set to 160 to 200° C. Meanwhile, in a case (comparative example) where heating by the heating rollers 220 and 230 was not performed, the maximum pultruding rate was 40 m/min. At a pultruding rate slightly exceeding 40 m/min, tension of the reinforcing fiber bundle traveling through the crosshead 5 increased markedly with an increase in viscosity of the molten resin, and it was no longer possible to perform pultrusion.

Figure 13:
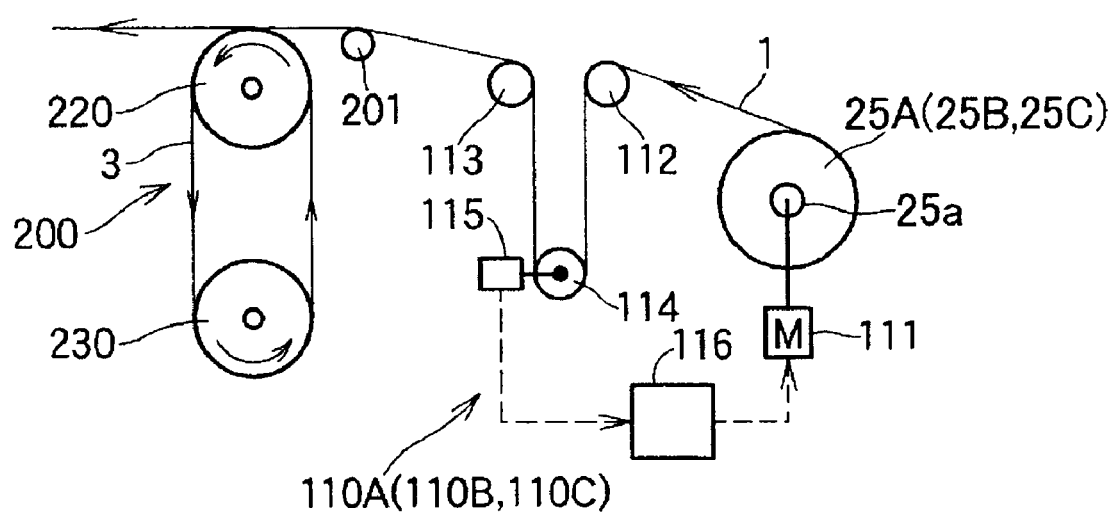
FIG. 13 is a view used to describe another example of the back tension imparting apparatus according to the second embodiment of the invention.

FIG. 13 is a view used to describe another example of the back tension imparting apparatus according to the second embodiment.

Referring to FIG. 13, numeral 111 denotes a bobbin driving motor that is coupled to the rotational shaft 25a of the bobbin 25A to rotationally drive the bobbin 25A in response to pultrusion of the reinforcing fiber 1 by the twisting rollers 31a and 31b. Numerals 112 and 113 denote fixed guiding rollers, and numeral 114 denotes a dancer roller capable of moving vertically. Numeral 115 denotes a dancer roller position detector formed using a rotary potentiometer that detects vertical motions of the dancer roller 114 as an angle of rotation. The position at which specific back tension is applied to the reinforcing fiber 1 heading to the inlet-side guide 201 of the heating roller device 200 is set as the reference position of the dancer roller 114.

The specific back tension is imparted to the reinforcing fiber 1 by the configuration in which when the position of the dancer roller 114 is lowered below the reference position, the rotational velocity of the bobbin driving motor 111 is decelerated, whereas when the position is raised above the reference position, the rotational velocity is accelerated according to a command from a tension controller 116 to which a position signal of the dancer roller 114 is given from the dancer roller position detector 115. Alternatively, the bobbin driving motor 111 may be replaced with a powder brake coupled to the rotational shaft 25a of the bobbin 25A, so that when the position of the dancer roller 114 is lowered below the reference position, the brake is pressed whereas when the position is raised above the reference position, the brake is released.

The bobbin driving motor 111, the fixed guide rollers 112 and 113, the dancer roller 114, and the dancer roller position detector 115, and the tension controller 116 together form a reinforcing fiber back tension imparting device 110A that applies back tension to the reinforcing fiber 1 from the bobbin 25A. Reinforcing fiber back tension imparting devices 110B and 110C that apply back tension to the reinforcing fibers 1 from the respective bobbins 25B and 25C are of the same configuration as the reinforcing fiber back tension imparting device 110A. These reinforcing fiber back tension imparting devices 110A through 110C together form a back tension imparting apparatus that imparts back tension to the reinforcing fiber bundle 3 wound around the heating rollers 220 and 230.

Figure 14:
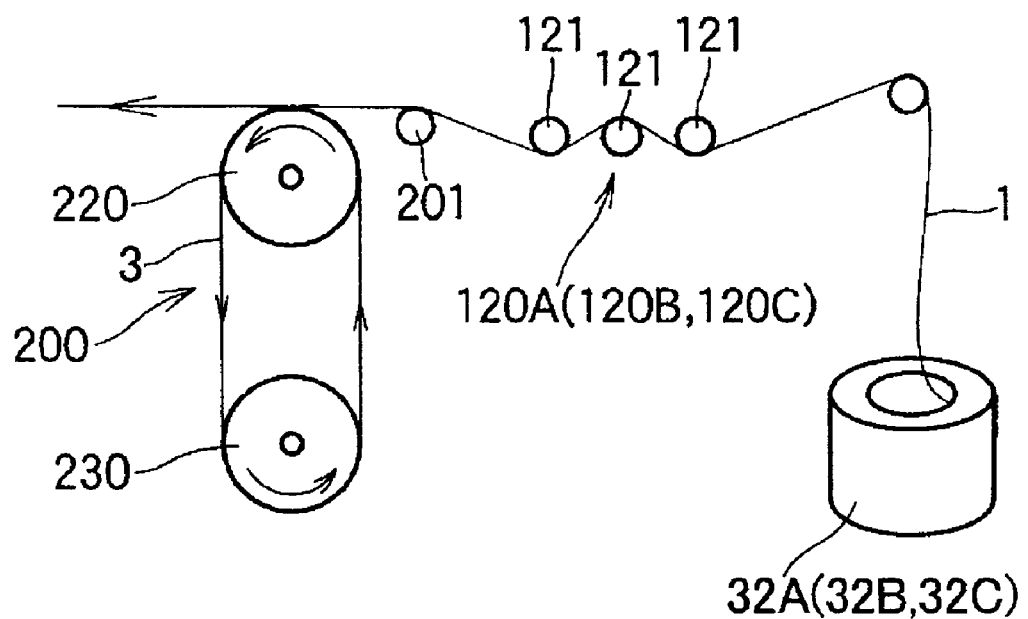
FIG. 14 is a view used to describe still another example of the back tension imparting apparatus according to the second embodiment of the invention.

FIG. 14 is a view used to describe still another example of the back tension imparting apparatus according to the second embodiment.

Referring to FIG. 14, alpha-numeral 32A denotes a reinforcing fiber accommodation container in which a long reinforcing fiber 1 wound up in a cylindrical shape is accommodated. Back tension is applied to the reinforcing fiber 1 pulled out from the reinforcing fiber accommodation container 32A while it travels in zigzags due to plural guide bars 121, and it is introduced into a pair of the heating rollers 220 and 230 in the heating roller device 200 while back tension is being applied thereto.

The plural guide bars 121 together form a reinforcing fiber back tension imparting device 120A that applies back tension to the reinforcing fiber 1 from the reinforcing fiber accommodation container 32A. Reinforcing fiber back tension imparting devices 120B and 120C that apply back tension to the reinforcing fibers 1 from other reinforcing fiber accommodation containers 32B and 32C are of the same configuration as the reinforcing fiber back tension imparting device 120A. These reinforcing fiber back tension imparting devices 120A through 120C together form a back tension imparting apparatus that imparts back tension to the reinforcing fiber bundle 3 wound around the heating rollers 220 and 230.

The embodiment above has described the manufacturing apparatus configured in such a manner that a reinforcing fiber bundle is wound around two heating rollers alternately. However, the manufacturing apparatus of the invention is not limited to this configuration, and for example, three or more heating rollers may be used. Alternatively, in the case of using two heating rollers, the reinforcing fiber bundle may be wound around the both heating rollers alternately in a crossed state. When configured in this manner, a contact length per turn can be increased.

Prior arts relating to the second embodiment will be described below.

The applicant of the invention previously proposed a method described in JP-A-5-169445 as a method of manufacturing a continuous fiber-reinforced resin strand by continuously pultruding a continuous fiber-reinforced resin strand formed of a resin-impregnated reinforcing fiber bundle to which twists are imparted from the crosshead (first prior art). The first prior art will be described using FIG. 17.

The first prior art is configured to manufacture a continuous fiber-reinforced resin strand having high adhesion between a reinforcing fiber and resin. A molten resin material 52 is continuously supplied to a crosshead 55 from an extruding machine 56. A forming die 59, a cooler 60, twisting rollers (referred to also as cross roller capstans) 61*a* and 61*b*, and pultruding rollers 62 are provided sequentially in this order at the exit side of the crosshead 55. Spreaders (impregnation rollers) 58 that spread a reinforcing fiber bundle by forcing it to travel in zigzags for enhancing impregnation are provided inside the crosshead 55.

After reinforcing fibers 51, 51, ..., and so forth are soaked in the molten resin material 52 inside the crosshead 55 so as to be impregnated with resin, the form is given by the forming die 59 and the sectional shape is determined, after which they are cooled to harden in the cooler 60. The twisting rollers 61*a* and 61*b* are a pair of rollers made of rubber, and configured to be driven to rotate inversely with respect to each other. These twisting rollers 61*a* and 61*b* are disposed so as to incline in the directions opposite to each other within a horizontal plane, and as a fiber-reinforced resin strand 53 is pultruded in the direction indicated by an arrow while being pinched by these twisting rollers 61*a* and 61*b* at the crossed portion, the fiber-reinforced resin strand 53 is rotated about the shaft center. Accordingly, twists are imparted on the way to the cooler 60 from the spreader 58*a* on the lowermost stream side inside the crosshead 55. The fiber-reinforced resin strand 53 formed of the resin-impregnated reinforcing fiber bundle to which twists are imparted is cut by a pelletizer (strand cutter) 63 provided at a position away from the pultruding rollers 62.

As has been described, according to the first prior art, because the reinforcing fiber bundle is impregnated with resin while being twisted, the reinforcing fiber and the resin material can be adhered to each other firmly. In addition, because it is configured in such a manner that the resin-impregnated reinforcing fiber bundle is pultruded while being twisted, there can be achieved a function of pultruding the bundle to the outside of the forming die while taking fluffing of the fiber into twists. Hence, because fluffing generated inside the crosshead hardly clogs the forming die in comparison with the configuration in which no twits are imparted to the resin-impregnated reinforcing fiber bundle, it is possible to accelerate a pultruding rate of the fiber-reinforced resin strand.

However, when the fiber-reinforced resin strand is manufactured in attempting to achieve a further higher pultruding rate, tension acting on the reinforcing fiber bundle pultruded to travel through the crosshead becomes so large that a breaking occurs, which limits the pultruding rate to 30 to 40 m/min.

The applicant of the invention also previously proposed, in a method for manufacturing a fiber-reinforced resin strand by continuously pultruding a fiber-reinforced resin strand formed of a resin-impregnated reinforcing fiber bundle to which twists are imparted from the crosshead, a method by which opening of the reinforcing fiber bundle is performed inside the crosshead and synthetic resin in a portion where resin impregnation needs to be promoted is heated particularly in order to let the reinforcing fiber bundle be impregnated with molten synthetic resin sufficiently (second prior art, JP-A-6-254850). In this case, as impregnation rollers inside the crosshead, for example, hydrothermal introduction impregnation rollers are used to perform the heating described above.

According to the second prior art, it is possible to suppress a temperature drop of the molten synthetic resin caused when a reinforcing fiber bundle at normal temperature is introduced into the crosshead, which consequently makes it possible to suppress an increase in viscosity of the molten synthetic resin inside the crosshead. Hence, it is expected that a pultruding rate of the fiber-reinforced resin strand is accelerated by suppressing an increase in tension of the reinforcing fiber bundle that is pultruded to travel through the crosshead.

However, from experiments conducted by the inventors, it is found that when the pultruding rate of a continuous resin-reinforced resin strand exceeds 40 m/min in the second prior art, not only the degree of impregnation of the reinforcing fiber bundle with molten resin is deteriorated, but also a breaking occurs due to an increase in tension of the reinforcing fiber bundle traveling through the crosshead.

This led the inventors to an idea of pre-heating the reinforcing fiber bundle introduced into the crosshead instead of heating the synthetic resin in a portion where resin impregnation is promoted inside the crosshead. JP-A-6-254850 cited above proposed earlier by the applicant implies that a reinforcing fiber to be introduced into the crosshead may be pre-heated when the need arises; however, it is silent about means for performing such pre-heating.

Meanwhile, JP-A-5-162135 discloses, in a method for manufacturing a fiber-reinforced thermoplastic resin structure by letting a continuous reinforcing fiber be coated and impregnated with molten thermoplastic resin while being pultruded, a manufacturing method of a fiber-reinforced thermoplastic resin structure by which the reinforcing fiber is pre-heated to a melting temperature of the thermoplastic resin or higher by a hot air pre-heating furnace before the reinforcing fiber is coated and impregnated with molten thermoplastic resin, so that a pultruding rate is accelerated by promoting impregnation of the reinforcing fiber with molten thermoplastic resin (third prior art).

The third prior art shows a case where a reinforcing fiber (glass roving fiber) is introduced into a hot air pre-heating furnace and heated to about 300° C. and a strip-shaped fiber-reinforced thermoplastic resin structure (glass fiber-reinforced nylon 6/6) is obtained at a pultruding rate of 18 m/min.

JP-A-7-251437 shows a manufacturing method of a continuous fiber-reinforced thermoplastic composite material, by which, when a continuous fiber-reinforced thermoplastic composite material is manufactured, a continuous reinforcing fiber is introduced into a pre-heat treatment device to be pre-heated before thermoplastic resin is adhered to the continuous reinforcing fiber (fourth prior art).

The fourth prior art shows a case where a hot air or infrared radiation pre-heat treatment device is used to pre-heat a continuous reinforcing fiber at a pre-heat treatment temperature (heat treatment temperature) of 120 to 230° C. for a pre-heat treatment time (heat treatment time) of 10 sec to 1 min when a combination of a fiber and resin is, for example, a glass fiber and polypropylene resin. The example therein shows a case where a glass fiber is subjected to heat treatment (pre-heat treatment) at 200° C. and a tape of a continuous fiber-reinforced thermoplastic composite material is obtained at a pultruding rate of 20 m/min.

However, according to the third and fourth prior arts, when a continuous reinforcing fiber bundle that is pultruded to travel is heated before the reinforcing fiber bundle is impregnated with molten resin, non-contact heating, such as the hot air method, requiring a long traveling path extending in the horizontal direction of the reinforcing fiber bundle is used. Hence, in a case where a pultruding rate (production rate) is accelerated, a large space to install a longer heating device (pre-heating device) is necessary, which poses a problem.

To be more specific, a manufacturing apparatus of a fiber-reinforced resin strand according to the second embodiment is an apparatus that manufactures a fiber-reinforced resin strand, characterized by including: a crosshead in which a long reinforcing fiber bundle continuously introduced therein from upstream is impregnated with molten resin; twisting rollers that are provided downstream from the crosshead and twist a resin-impregnated reinforcing fiber bundle; a cooling device that is provided between the twisting rollers and the crosshead and cools a fiber-reinforced resin strand formed of a reinforcing fiber bundle pultruded from the crosshead; a heating roller device that is provided upstream of the crosshead and pre-heats the reinforcing fiber bundle introduced into the crosshead; and a back tension imparting apparatus that is provided upstream of the heating roller device and imparts back tension to the reinforcing fiber bundle on a way to the heating roller device, wherein the heating roller device has at least two heating rollers each of which generates heat and around which the reinforcing fiber bundle is wound alternately in several turns, and the back tension imparting apparatus imparts the back tension so that the reinforcing fiber bundle comes into contact with each of the heating rollers.

The manufacturing apparatus of a fiber-reinforced resin strand according to the second embodiment includes the heating roller device provided upstream of the crosshead and the back tension imparting apparatus that is provided upstream of the heating roller device and imparts back tension to a reinforcing fiber bundle wound around the respective heating rollers in the heating roller device. Accordingly, the reinforcing fiber bundle is wound at least two heating rollers disposed, for example, at top and bottom in heating roller device alternately in several turns while back tension is being applied thereto by the back tension imparting apparatus, so that it travels while coming into close contact with the heating rollers being heated and is therefore introduced into the crosshead continuously not at normal temperature but in a pre-heated state.

Hence, even when the pultruding rate of the reinforcing fiber bundle is accelerated, not only is it possible to let the reinforcing fiber bundle be impregnated with molten resin sufficiently owing to the ability to suppress a temperature drop of the molten resin inside the crosshead, but it is also possible to suppress an increase in tension of the reinforcing fiber bundle (resin-impregnated reinforcing fiber bundle) that travels through the crosshead owing to the ability to suppress an increase in viscosity of the molten resin inside the crosshead. Hence, not only can a fiber-reinforced resin strand be manufactured at a pultruding rate higher than the conventional pultruding rate (production rate), for example, a pultruding rate exceeding 40 m/min, but also an installment space for the heating roller device provided to accelerate the pultruding rate can be smaller.

In the manufacturing apparatus of a fiber-reinforced resin strand according to the second embodiment, it is preferable that at least one of the heating rollers has plural circumferential grooves aligned side by side in a direction of a roller rotational shaft in a roller outer circumferential portion as grooves that guide the reinforcing fiber bundle.

Figure 15:
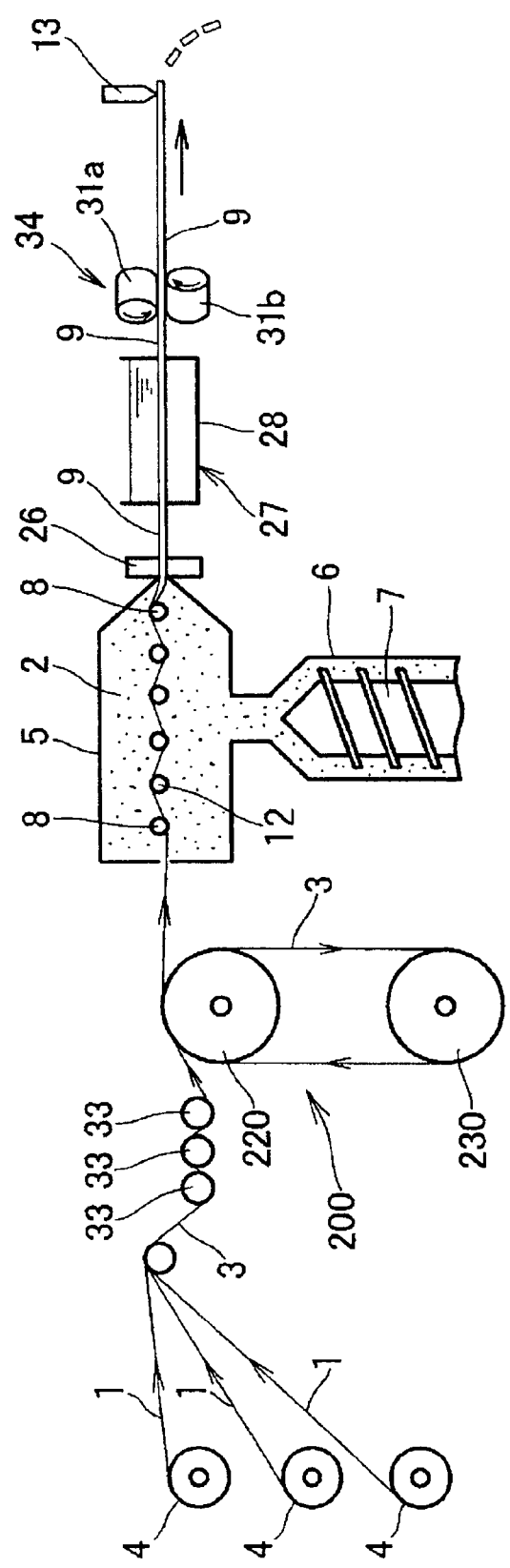
FIG. 15 is an explanatory view schematically showing the configuration of a manufacturing apparatus of a fiber-reinforced resin strand according to a third embodiment of the invention.

Hereinafter, a third embodiment of the invention will be described with reference to the drawings. FIG. 15 is an explanatory view showing the configuration of a manufacturing apparatus of a fiber-reinforced resin strand according to the third embodiment of the invention.

As is shown in FIG. 15, in order to perform pre-heat treatment, a reinforcing fiber bundle 3 formed of reinforcing fibers 1 fed from plural bobbins 4 is introduced into a heating roller device 200 equipped with a pair of heating rollers 220 and 230 disposed at top and bottom. The reinforcing fiber bundle 3 is wound around a pair of the heating rollers 220 and 230 alternately in several turns while back tension is being applied thereto by plural guide bars 33, so that the temperature thereof is raised through contact heating as it comes into close contact with the heating rollers 220 and 230 being heated.

An extruding machine 6 equipped with a built-in screw 7 and a crosshead (molten resin bath container) 5 in which molten resin (melted thermoplastic resin) 2 is continuously supplied from the extruding machine 6 and the heated reinforcing fiber bundle 3 from the heating roller device 200 is introduced are provided immediately downstream from the heating roller device 200. Plural spreaders (spreading and impregnation rollers) 8 for letting the continuously supplied reinforcing fiber bundle 3 be impregnated with the molten resin 2 are provided inside the crosshead 5. A forming die 26 that performs forming (molding) of a hot fiber-reinforced resin strand 9 formed of a resin-impregnated reinforcing fiber bundle to which twists are imparted by being pultruded from the crosshead 5 is attached at the exit of the crosshead 5.

A cooling device 27 that cools the hot fiber-reinforced resin strand 9 introduced therein from the crosshead 5 in cooling water is provided downstream from the crosshead 5 attached with the forming die 26. In addition, a twisting device 34 is provided immediately downstream from the cooling device 27. The fiber-reinforced resin strand 9 manufactured by the manufacturing apparatus of this embodiment and introduced to a downstream side of the twisting device 34 is cut into pellets by a pelletizer (strand cutter) 13 provided downstream from the twisting device 34.

Because the a heating roller device 200 is of the same configuration as the counterpart in the second embodiment described with reference to FIG. 6 and FIG. 9, descriptions thereof are omitted herein.

Also, because the cooling device 27 is of the same configuration as the counterpart in the second embodiment described with reference to FIG. 10 and FIG. 11, descriptions thereof are omitted herein.

The twisting device 34 will now be described. The twisting device 34 has a pair of twisting rollers 31a and 31b. Because these twisting rollers 31a and 31b are of the same configuration as the counterparts in the second embodiment described with reference to FIG. 12, descriptions thereof are omitted herein.

The manufacturing of a fiber-reinforced resin strand by the manufacturing apparatus of a fiber-reinforced resin strand configured as described above will now be described. A reinforcing fiber bundle 3 formed of reinforcing fibers fed from the plural bobbins 4 is introduced into a pair of the heating rollers 220 and 230 disposed at top and bottom and is wound around the heating rollers 220 and 230 alternately in several turns while back tension is being applied thereto. Hence, it is introduced into the crosshead 5 in a state where the temperature thereof is raised through contact heating. The reinforcing fiber bundle 3 is impregnated with resin while passing by the respective spreaders 8 inside the crosshead 5 filled with hot molten resin 2 supplied from the extruding machine 6 and made into a resin-impregnated reinforcing fiber bundle. With the resin-impregnated reinforcing fiber bundle, twists are developed and grown from the downstream spreader 8 inside the crosshead 5 as the starting point owing to the twisting operations by the twisting device 34. As has been described, by letting the reinforcing fiber bundle 3 be impregnated with the molten resin 2 supplied from the extruding machine 6 inside the crosshead 5 and by imparting twists to the resin-impregnated reinforcing fiber bundle by the twisting operations by the twisting device 34, the fiber-reinforced resin strand 9 formed of the resin-impregnated reinforcing fiber bundle to which twists are imparted from the crosshead 5 is pultruded continuously.

Figure 16:
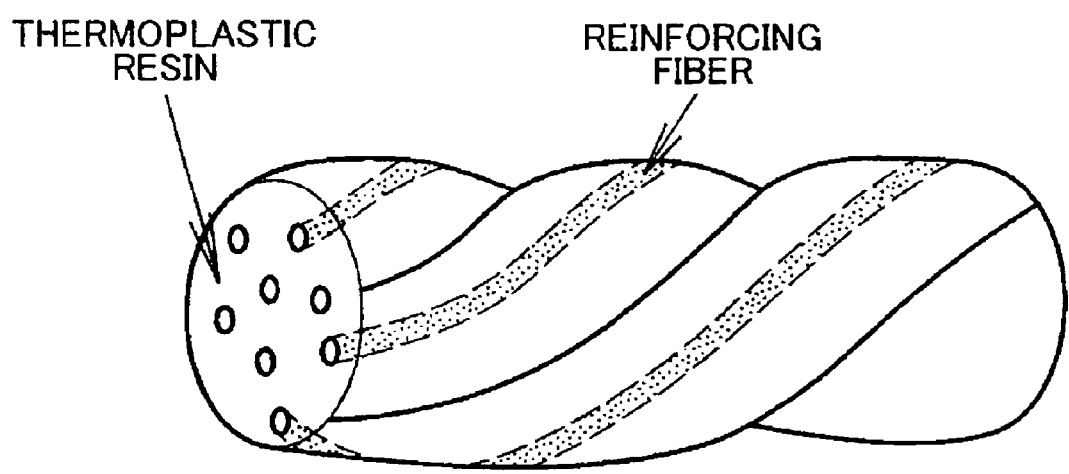
FIG. 16 is a schematic view of pellets made by cutting a twisted fiber-reinforced resin strand.

The hot fiber-reinforced resin strand 9 pultruded continuously from the crosshead 5 by way of the forming die 26 is introduced into the cooling device 27 to travel in the cooling water inside the cooling water bath 28, and is cooled to harden by undergoing a water flow from the water ejection nozzles 29 (see FIG. 10 and FIG. 11) disposed in a stagger fashion with the traveling path in between, after which it is introduced into the twisting rollers 31a and 31b. The twisting rollers 31a and 31b perform the twisting operations and the pultrusion on the cooled fiber-reinforced resin strand 9 from the cooling device 27. The fiber-reinforced resin strand 9 introduced to the downstream side of the twisting device 34 is cut into pellets by the pelletizer 13 provided downstream from the twisting device 34 (see FIG. 16).

As has been described, the manufacturing apparatus of a fiber-reinforced resin strand of this embodiment includes, as a cooling device 27 between the crosshead 5 and the twisting device 34, plural water ejection nozzles 29 provided spaced apart along the traveling direction of the fiber-reinforced resin strand 9 for ejecting water toward the fiber-reinforced resin strand 9 in the cooling water inside the cooling water bath 28 in which the hot fiber-reinforced resin strand 9 is pultruded from the crosshead 5 to travel in the horizontal direction in the cooling water.

Hence, by stirring the cooling water inside the cooling water bath with a water flow developed by ejection of water from the water ejection nozzles 29, a fresh cooling water flow is continuously introduced to come into contact with the fiber-reinforced resin strand 9 that travels in the cooling water from the inlet side to the outlet side. It is thus possible accelerate the cooling rate for the fiber-reinforced resin strand 9 by efficiently performing heat exchange between the continuous fiber-reinforced resin strand 9 and the cooling water in comparison with a cooling water bath equipped with no water ejection nozzles 29. When configured in this manner, in a case where a fiber-reinforced resin strand is manufactured at a high pultruding rate exceeding, for example, 40 m/min, it is possible to cool the fiber-reinforced resin strand 9 sufficiently without the need to extend the length of the cooling water bath (the length in the fiber-reinforced resin strand traveling direction) in comparison with a case at the conventional pultruding rate of 40 m/min or lower. It is thus possible to manufacture the fiber-reinforced resin strand 9 formed of the reinforcing fiber bundle impregnated with the resin material sufficiently at a pultruding rate higher than the conventional pultruding rate, for example a pultruding rate exceeding 40 m/min, without causing slipping of the fiber-reinforced resin strand 9 in the twisting device 34.

Also, the water ejection nozzles 29 are disposed in a stagger fashion with the fiber-reinforced resin strand traveling path in between. Hence, it is possible to suppress the position of the fiber-reinforced resin strand 9 from being shifted in one direction by a water flow from the water ejection nozzles 29, which allows the fiber-reinforced resin strand 9 to travel smoothly in a straight line. The water ejection nozzles 29 may be disposed oppositely instead of being disposed in a stagger fashion.

In the manufacturing apparatus of a fiber-reinforced resin strand of this embodiment, the twisting device 34 is formed of a pair of the twisting rollers 31a and 31b having a capability of imparting twists to a fiber-impregnated reinforcing fiber bundle and a capability of pultruding the continuous fiber-reinforced resin strand 9, which eliminates the need to provide a pultruding device separately. The apparatus configuration can be therefore simpler.

In addition, the manufacturing apparatus of a fiber-reinforced resin strand of this embodiment is provided with the heating roller device 200 provided upstream of the crosshead 5 to heat the reinforcing fiber bundle 3 before being introduced into the crosshead 5. In a case where a reinforcing fiber bundle at normal temperature is supplied to the crosshead at a high rate, the viscosity of the molten resin increases with a temperature drop of the molten resin inside the crosshead, which not only deteriorates the degree of impregnation of the reinforcing fiber bundle with molten resin, but also increases tension (pultruding resistance) of the reinforcing fiber bundle that is pultruded to travel through the crosshead. Hence, by providing the heating roller device 200, not only is it possible to eliminate deterioration of the degree of impregnation, but it is also possible to suppress an increase of the tension markedly, which can in turn further accelerate the pultruding rate (production rate) of the fiber-reinforced resin strand 9.

In the manufacturing apparatus of a fiber-reinforced resin strand of this embodiment, the twisting device 34 is formed of a pair of the twisting rollers 31a and 31b made of metal with the asperities 31Aa and 31Ba (see FIG. 12) being formed on the roller surfaces. Hence, because a frictional coefficient between the twisting rollers 31a and 31b made of metal and the fiber-reinforced resin strand 9 becomes larger, combined with the cooling effect on the fiber-reinforced resin strand 9 by the cooling device 27, it becomes possible to impart twists to the fiber-reinforced resin strand 9 without causing slipping of the fiber-reinforced resin strand 9 in a reliable manner. In addition, because they are twisting rollers made of metal, they are more resistant to wear and have a longer life than twisting rollers made of rubber. It is thus possible to perform pultrusion over a long period without causing slipping of the fiber-reinforced resin strand 9.

EXAMPLE

A manufacturing test of a fiber-reinforced resin strand was conducted using the apparatus shown in FIG. 15 and FIGS. 10 through 12. A glass fiber was used as a reinforcing fiber and polypropylene was used as thermoplastic resin.

The cooling device 27 in Examples 1 through 4 will now be described. The length of the cooling water bath 28 was 2 m. Regarding the water ejection nozzles 29, 20 of them were disposed in a line on one side (the lower side of FIG. 10) and 20 of them were disposed in a line on the other side (the upper side of FIG. 10) with respect to the strand traveling path in a stagger fashion with the fiber-reinforced resin strand traveling path in between. The distance between the center lines of the adjacent water ejection nozzles 29 in the strand traveling direction was 70 mm. The length of the cooling water bath 28 in Comparative Example 1 and Comparative Example 2 was also 2 m (in Comparative Examples 1 and 2, no water ejection nozzles 29 were provided).

In Examples 1 through 4 and Comparative Examples 1 and 2, the roller temperature of heating rollers 220 and 230 in a pre-heating device 200 was raised to 300° C. In this instance, the temperature of the reinforcing fiber bundle 3 to be introduced into the crosshead 5 was about 250° C.

Twisting rollers (cross rolls) 31a and 31b in a twisting device 34 in Examples 1 through 4 and Comparative Examples 1 and 2 will now be described. Both the twisting rollers 31a and 31b were mechanisms driven to rotate and made of a heat-treated material of SKD11 (alloy tool steel) with asperities having a twill line pitch of 1 mm being formed on the entire roller surfaces by knurl machining.

From the preliminary test, it is understood that when the temperature of the continuous fiber-reinforced resin strand immediately after having passed through the cooling water bath is 75° C. or below, it is possible to pultrude the continuous fiber-reinforced resin strand without causing slipping in the twisting rollers. Given these circumstances, a pultruding rate in a case where the temperature of the continuous fiber-reinforced resin strand immediately after having passed through the cooling water bath was 75° C. or below was checked using a cooling water bath having a length of 2 m, and the results are set forth in Table 1 below.

fiber-reinforced resin strand to be cooled by raising the temperature of the molten resin inside the crosshead from the temperature of Example 2. Even in a case where the temperature was markedly higher than normal temperature using a cooling path as short as 2 m, it was still possible to pultrude the fiber-reinforced resin strand at a high rate of 90 m/min (the pultruding rate was not accelerated any further), which is so high that it cannot be compared with the conventional rate (see Comparative Example 2).

Meanwhile, Comparative Example 1 is a case where an operation was performed for a fiber-reinforced resin strand having the diameter of 4 mm same as that of Example 3 under the same pre-heating condition as Example 3 except that water was not ejected from the water ejection nozzles in the cooling water bath. In Comparative Example 1, slipping occurred at a rate slightly exceeding 26 m/min, which is lower than the rate in Example 3 (pultruding rate: 44 m/min).

Comparative Example 2 is a case where an operation was performed for a fiber-reinforced resin strand having the diameter of 2.4 mm same as that of Example 4 under the same pre-heating condition as Example 4 except that water was not ejected from the water ejection nozzles in the cooling water bath. In Comparative Example 2, slipping occurred at a rate

TABLE 1

| CLASSIFICATION | STRAND MAJOR DIAMETER | MAXIMUM PULTRUDING RATE | COOLING DEVICE | PRE-HEAT HEATING DEVICE | REMARKS: STRAND TEMPERATURE BEFORE COOLING |
|---|---|---|---|---|---|
| EXAMPLE 1 | 4 mm | 55 m/MIN | COOLING WATER BATH + WATER EJECTION NOZZLES | PROVIDED | 250° C. |
| EXAMPLE 2 | 2.4 mm | 90 m/MIN OR HIGHER | COOLING WATER BATH + WATER EJECTION NOZZLES | PROVIDED | 250° C. |
| EXAMPLE 3 | 4 mm | 44 m/MIN | COOLING WATER BATH + WATER EJECTION NOZZLES | PROVIDED | 320° C. |
| EXAMPLE 4 | 2.4 mm | 90 m/MIN OR HIGHER | COOLING WATER BATH + WATER EJECTION NOZZLES | PROVIDED | 320° C. |
| COMPARATIVE EXAMPLE 1 | 4 mm | 26 m/MIN | COOLING WATER BATH | PROVIDED | 320° C. |
| COMPARATIVE EXAMPLE 2 | 2.4 mm | 40 m/MIN | COOLING WATER BATH | PROVIDED | 320° C. |

In Example 1, it was possible to pultrude a thick continuous fiber-reinforced resin stand having a major diameter of 4 mm and therefore not being readily cooled at a rate exceeding 50 m/min under the limitation that the cooling path was as short as 2 m.

In Example 2, it was possible to pultrude a rather narrow continuous fiber-reinforced resin strand having a major diameter of 2.4 mm at a high rate of 90 m/min, which is so high that it cannot be compared with a conventional rate (the pultruding rate was not accelerated further) under the limitation that the cooling path was as short as 2 m.

Example 3 is a case where a fiber-reinforced resin strand having the diameter of 4 mm same as that of Example 1 was pultruded under the condition that made it harder for the fiber-reinforced resin strand to be cooled by raising the temperature of the molten resin inside the crosshead from the temperature of Example 1. Even in a case where the outer diameter was greater and the temperature was markedly higher than normal temperature using a cooling path as short as 2 m, it was still possible to pultrude the continuous fiber-reinforced resin strand at a rate exceeding 40 m/min, which is higher than the conventional pultruding rate (see Comparative Example 1).

Example 4 is a case where a fiber-reinforced resin strand having the diameter of 2.4 mm same as that of Example 2 was pultruded under the condition that made it harder for the slightly exceeding 40 m/min, which is lower than the rate in Example 4 (pultruding rate: 90 m/min or higher).

In Examples of the invention, the reinforcing fiber bundle is heated by a heating roller device 200. However, the manufacturing apparatus of a fiber-reinforced resin strand of the invention is able to exert the effect on an apparatus having no heating roller device as long as it is capable of maintaining appropriate viscosity of the molten resin inside the crosshead.

Hereinafter, a prior art of the third embodiment will be described.

The applicant of the invention previously proposed an apparatus disclosed in JP-A-5-169445 as an apparatus that manufactures a fiber-reinforced resin strand. This apparatus will now be described with reference to FIG. 17.

This manufacturing apparatus of a fiber-reinforced resin strand in the prior art is configured to manufacture a fiber-reinforced resin strand having high adhesion between a reinforcing fiber and resin. A molten resin material 52 is continuously supplied to a crosshead (impregnation head) 55 by an extruding machine 56. A forming die 59, a cooler 60, twisting rollers (referred to also as cross roller capstans) 61a and 61b, and pultruding rollers 62 are provided sequentially in this order at the exist side of the crosshead 55, and spreaders 58 to spread the reinforcing fiber bundle are provided inside the crosshead 55.

After reinforcing fibers 51, 51, . . . , and so forth are soaked in the molten resin material 52 inside the crosshead 55 so as to be impregnated with resin, the sectional shape thereof is determined by the forming die 59, after which they are cooled to harden in the cooler 60. The twisting rollers 61a and 61b are rollers made of rubber, and configured to be driven to rotate inversely. These twisting rollers 61a and 61b are disposed so as to incline in directions opposite to each other within a horizontal plane, and the fiber-reinforced resin strand 53 is rotated about the shaft center by being pultruded in a direction indicated by an arrow while the fiber-reinforced resin strand 53 is pinched between these twisting rollers 61a and 61b at the crossed portion. Accordingly, twists are imparted on the way to the cooler 60 from the spreader 58a on the lowermost stream side inside the crosshead 55. The fiber-reinforced resin strand 53 to which twists are imparted is cut by a pelletizer 63 provided at a position remote from the pultruding rollers 62.

Incidentally, when a fiber-reinforced resin strand is manufactured by continuously pultruding a fiber-reinforced resin strand formed of a resin-impregnated reinforcing fiber bundle to which twists are imparted from the crosshead (impregnation head), in an experiment conducted by the inventors, in the case of a continuous fiber-reinforced resin strand having a major diameter of 2.4 mm, slipping occurred somewhere between the twisting rollers that pultrude the fiber-reinforced resin strand while twisting the strand and the fiber-reinforced resin strand when a pultruding rate (production rate) of the fiber-reinforced resin stand slightly exceeded 40 m/min.

In order to sufficiently cool the fiber-reinforced resin strand that is pultruded from the crosshead to travel in the horizontal direction before it reaches the twisting rollers, a cooling water bath was used, which stores cooling water for letting the fiber-reinforced resin strand traveling in the horizontal direction pass through the cooling water so as to be cooled. When configured in this manner, because a long cooling water bath is required to perform cooling sufficiently and the twisting rollers have to be provided downstream from the long cooling water bath, the degree of twist tends to be weaker on the upstream side of the cooling water bath. It was discovered that the degree of twist consequently becomes weaker when the reinforcing fiber bundle is impregnated with resin while being twisted as the pultruding rate of the fiber-reinforced resin strand is accelerated, and the reinforcing fiber bundle was not impregnated with resin sufficiently.

Given these circumstances, an object of the third embodiment is to provide a manufacturing apparatus of a fiber-reinforced resin strand configured to be able to manufacture a fiber-reinforced resin strand at a pultruding rate (production rate) higher than the conventional rate, for example, a pultruding rate exceeding 40 m/min, when a fiber-reinforced resin strand is manufactured by continuously pultruding a fiber-reinforced resin strand formed of a resin-impregnated reinforcing fiber bundle to which twists are imparted from the crosshead.

More specifically, a manufacturing apparatus of a fiber-reinforced resin strand according to the third embodiment is an apparatus that manufactures a fiber-reinforced resin strand, characterized by including: a crosshead in which a long reinforcing fiber bundle continuously introduced therein from upstream is impregnated with molten resin; a twisting device that is provided downstream from the crosshead and twists a resin-impregnated reinforcing fiber bundle; a cooling device that is provided between the crosshead and the twisting device and cools a fiber-reinforced resin strand formed of a reinforcing fiber bundle pultruded from the crosshead; and a pultruding device that is provided downstream from the cooling device and pultrudes the fiber-reinforced resin strand from the crosshead, wherein the cooling device has a cooling water bath that stores cooling water to allow the fiber-reinforced resin strand pultruded from the crosshead to pass through the cooling water, and plural water ejection nozzles that are provided inside the cooling water bath to be spaced apart in a traveling direction of the fiber-reinforced resin strand and eject water toward the fiber-reinforced resin strand in the cooling water.

The manufacturing apparatus of a fiber-reinforced resin strand according to the third embodiment includes the cooling device provided between the crosshead and the twisting rollers. Plural water ejection nozzles are provided in the cooling water bath storing cooling water for the hot fiber-reinforced resin strand pultruded from the crosshead to pass through while being spaced apart in the traveling direction of the fiber-reinforced resin strand for ejecting water toward the fiber-reinforced resin strand in the cooling water. Hence, by stirring the cooling water inside the cooling water bath with a water flow developed by ejection of water from the water ejection nozzles, a fresh cooling water flow is continuously introduced to come into contact with the fiber-reinforced resin strand that passes through the cooling water. It is thus possible accelerate the cooling rate for the fiber-reinforced resin strand by efficiently performing heat exchange between the fiber-reinforced resin strand and the cooling water in comparison with a cooling water bath equipped with no water ejection nozzles. Accordingly, in a case where a fiber-reinforced resin strand is manufactured at a high pultruding rate, for example, a pultruding rate exceeding 40 m/min, it is possible to cool the fiber-reinforced resin strand sufficiently without the need to extend the length of the cooling water bath (the length in the fiber-reinforced resin strand traveling direction) in comparison with the case of the conventional pultruding rate of 40 m/min or lower. It is thus possible to manufacture a fiber-reinforced resin strand formed of a reinforcing fiber bundle impregnated with the resin material sufficiently at a higher pultruding rate than the conventional pultruding rate, for example, a pultruding rate exceeding 40 m/min, without causing slipping of the continuous fiber-reinforced resin strand in the twisting device.

In the manufacturing apparatus of a fiber-reinforced resin strand according to the third embodiment, it is preferable that the water ejection nozzles are disposed oppositely or in a stagger fashion with a traveling path of the fiber-reinforcing resin strand in between.

In the manufacturing apparatus of a fiber-reinforced resin strand, the water ejection nozzles that eject water toward the fiber-reinforced resin strand traveling in the cooling water are provided oppositely or in a stagger fashion with the traveling path of the fiber-reinforced resin strand in between. It is thus possible to suppress the position of the fiber-reinforced resin strand from being shifted in one direction by a water flow from the water ejection nozzles, which allows the fiber-reinforced resin strand to travel smoothly in a straight line.

In the manufacturing apparatus of a fiber-reinforced resin strand according to the third embodiment, it is preferable that the twisting device is formed of a pair of twisting rollers disposed oppositely with the fiber-reinforced resin strand in between in a state where respective rotational shaft lines are held to be positioned on planes parallel to each other while angles of the respective rotational shaft lines on the planes are made different, and is used also as the pultruding device.

In the manufacturing apparatus of a fiber-reinforced resin strand, the twisting device is formed of a pair of twisting rollers disposed oppositely with the fiber-reinforced resin strand in between in a state where their respective rotational shaft lines are held to be positioned on parallel planes (horizontal planes) and the angles of the rotational shaft lines on the horizontal planes are made different, and has a capability of imparting twists to the resin-impregnated reinforcing fiber bundle and a capability of pultruding a continuous fiber-reinforced resin strand. The twisting device can be therefore used also as the pultruding device, which eliminates the need to provide the pultruding device separately. The apparatus configuration can be thus made simpler.

In the manufacturing apparatus of a fiber-reinforced resin strand according to the third embodiment, it is preferable to further include a pre-heat heating device that is provided upstream of the crosshead and heats the reinforcing fiber bundle introduced into the crosshead.

In the manufacturing apparatus of a fiber-reinforced resin strand, the pre-heat heating device that heats the reinforcing fiber bundle before being introduced into the crosshead is provided upstream of the crosshead. In a case where a reinforcing fiber bundle at normal temperature is supplied to the crosshead at a high rate, the viscosity of the molten resin increases as the temperature of the molten resin inside the crosshead drops, which not only deteriorates the degree of impregnation of the reinforcing fiber bundle with the molten resin, but also increases the tension (pultruding resistance) of the reinforcing fiber bundle that is pultruded to travel through the crosshead. Hence, by providing the pre-heat heating device, not only can deterioration of the degree of impregnation be eliminated, but also an increase of the tension can be suppressed markedly, which in turn makes it possible to accelerate the pultruding rate (production rate) of the fiber-reinforced resin strand significantly.

In the manufacturing apparatus of a fiber-reinforced resin strand according to the third embodiment, it is preferable that the twisting device is formed of at least a pair of twisting rollers made of metal with asperities being formed on roller surfaces.

In the manufacturing apparatus of a fiber-reinforced resin strand, the twisting device is formed of at least a pair of twisting rollers made of metal with the asperities being formed on the roller surfaces. Hence, because a frictional coefficient between the twisting rollers made of metal and the fiber-reinforced resin strand becomes larger, combined with the sufficient cooling effect on the fiber-reinforced resin strand by the cooling device, it is possible to suppress slipping between the fiber-reinforced resin strand and the twisting rollers in a more reliable manner when twists are imparted to the fiber-reinforced resin strand by the twisting device formed of a pair of twisting rollers made of metal. In addition, because the twisting rollers are made of metal, they are more resistant to wear and have longer life than twisting rollers made of rubber. It is thus possible to perform pultrusion over a long period without causing slipping of the continuous fiber-reinforced resin strand.

The invention claimed is:

1. A manufacturing method of a fiber-reinforcing resin strand comprising:
    forming a fiber-reinforced resin strand formed of a resin-impregnated fiber bundle obtained by spreading a reinforcing fiber bundle and letting the reinforcing fiber bundle be impregnated with a molten resin material inside a crosshead; and
    twisting the fiber-reinforced resin strand by pultruding the fiber-reinforced resin strand from an exit nozzle of the crosshead,
    wherein the fiber-reinforced resin strand is twisted by using twisting rollers including at least a pair of rollers having a roller major diameter of 50 mm or greater, the rollers being made of metal and having a surface hardness of Hs 60 or higher and having asperities on surfaces of thereof, while being pultruded from the exiting nozzle of the crosshead by using the twisting rollers.

2. A manufacturing apparatus of a fiber-reinforced resin strand, comprising:
    spreaders that are provided inside a crosshead into which a molten resin material is continuously supplied from an extruding machine and spread a reinforcing fiber bundle; and
    pairs of twisting rollers provided at a downstream position from an exit nozzle of the crosshead and including at least a pair of rollers that pultrude a fiber-reinforced resin strand formed of a resin-impregnated fiber bundle obtained by letting the reinforcing fiber bundle spread by the spreaders be impregnated with the molten resin material from the exit nozzle while twisting the fiber-reinforced resin strand,
    wherein, of the pairs of twisting rollers, at least one pair of the twisting rollers has a roller major diameter of 50 mm or greater and has a metal surface on which asperities are formed, wherein a surface hardness of the metal surface is Hs 60 or greater.

3. The manufacturing apparatus of a fiber-reinforced resin strand according to claim 2, further comprising:
    twist retaining rollers provided at a downstream position from the twisting rollers and formed of a pair of rollers that retains a twisted state of the fiber-reinforced resin strand,
    wherein both the rollers of the twist retaining rollers are made of metal on a surface of which asperities are formed.

4. The manufacturing apparatus of a fiber-reinforced resin strand according to claim 3, wherein:
    at least one roller from the both rollers of the twist retaining rollers is configured in such a manner so as to be able to come closer to and move apart from the other roller and to press the fiber-reinforced resin strand at a constant or variable pressing force.

5. The manufacturing apparatus of a fiber-reinforced resin strand according to claim 4, further comprising:
    roller interval adjusting means for enabling an adjustment of an interval between both the rollers of the twist retaining rollers so that a minimum interval set in response to a diameter of the fiber-reinforced resin strand is achieved.

6. The manufacturing apparatus of a fiber-reinforced resin strand according to claim 2, wherein:
    a particular pair of rollers included in the twisting rollers is configured in such a manner that at least one of the rollers is able to come closer to and move apart from the other roller and to press the fiber-reinforced resin strand at a constant or variable pressing force.

7. The manufacturing apparatus of a fiber-reinforced resin strand according to claim 6, further comprising:
    roller interval adjusting means for enabling an adjustment of an interval between rollers making a pair among the twisting rollers so that a minimum interval set in response to a diameter of the fiber-reinforced resin strand is achieved.

8. An apparatus that manufactures a fiber-reinforced resin strand, comprising:
    a crosshead in which a long reinforcing fiber bundle continuously introduced therein from upstream is impregnated with molten resin;
    twisting rollers that are provided downstream from the crosshead and twist a resin-impregnated reinforcing fiber bundle, wherein the twisting rollers have at least a pair of twisting rollers that is provided downstream from the crosshead and twists the resin-impregnated reinforcing fiber bundle, and wherein the pair of twisting rollers has a roller major diameter of 50 mm or greater and has a metal surface on which asperities are formed, wherein a surface hardness of the metal surface is Hs 60 or greater;

a cooling device that is provided between the twisting rollers and the crosshead and cools a fiber-reinforced resin strand formed of a reinforcing fiber bundle pultruded from the crosshead;

a heating roller device that is provided upstream of the crosshead and pre-heats the reinforcing fiber bundle introduced into the crosshead; and a back tension imparting apparatus that is provided upstream of the heating roller device and imparts back tension to the reinforcing fiber bundle on a way to the heating roller device, wherein the heating roller device has at least two heating rollers, each of which generates heat and around which the reinforcing fiber bundle is wound alternately in several turns, and the back tension imparting apparatus imparts the back tension so that the reinforcing fiber bundle comes into contact with each of the heating rollers.

9. The manufacturing apparatus of a fiber-reinforced resin strand according to claim 8, wherein:

at least one of the heating rollers has plural circumferential grooves aligned side by side in a direction of a roller rotational shaft in a roller outer circumferential portion as grooves that guide the reinforcing fiber bundle.

10. The manufacturing apparatus of a fiber-reinforced resin strand according to claim 9, wherein:

the twisting rollers have at least a pair of rollers that is provided downstream from the crosshead and twists the resin-impregnated reinforcing fiber bundle, and both the rollers are made of metal on a surface of which asperities are formed; and the cooling device has a cooling water bath that stores cooling water to allow the fiber-reinforced resin strand pultruded from the crosshead to pass through the cooling water, and plural water ejection nozzles that are provided inside the cooling water bath to be spaced apart in a traveling direction of the fiber-reinforced resin strand and eject water toward the fiber-reinforced resin strand in the cooling water.

11. The manufacturing apparatus of a fiber-reinforced resin strand according to claim 8, wherein:

the cooling device has a cooling water bath that stores cooling water to allow the fiber-reinforced resin strand pultruded from the crosshead to pass through the cooling water, and plural water ejection nozzles that are provided inside the cooling water bath to be spaced apart in a traveling direction of the fiber-reinforced resin strand and eject water toward the fiber-reinforced resin strand in the cooling water.

* * * * *